(12) United States Patent
McHugh et al.

(10) Patent No.: US 8,751,679 B2
(45) Date of Patent: Jun. 10, 2014

(54) HTTP ADAPTIVE STREAMING SERVER WITH AUTOMATIC RATE SHAPING

(75) Inventors: Kevin McHugh, Milton, GA (US); Charles Dasher, Lawrenceville, GA (US); Chris Phillips, Hartwell, GA (US)

(73) Assignee: Ericsson Television Inc., Duluth, GA (US)

( * ) Notice: Subject to any disclaimer, the term of this patent is extended or adjusted under 35 U.S.C. 154(b) by 185 days.

(21) Appl. No.: 13/268,237

(22) Filed: Oct. 7, 2011

(65) Prior Publication Data

US 2013/0091249 A1    Apr. 11, 2013

(51) Int. Cl.
*G06F 15/16*     (2006.01)
(52) U.S. Cl.
USPC ............... 709/231; 709/219; 709/233

(58) Field of Classification Search
USPC .................................. 709/217–234
See application file for complete search history.

(56) References Cited

U.S. PATENT DOCUMENTS

| | | |
|---|---|---|
| 2010/0268836 A1 | 10/2010 | Jabri et al. |
| 2011/0035507 A1 | 2/2011 | Brueck et al. |
| 2011/0082946 A1* | 4/2011 | Gopalakrishnan ............ 709/231 |
| 2012/0042091 A1* | 2/2012 | McCarthy et al. ............ 709/231 |
| 2012/0254456 A1* | 10/2012 | Visharam et al. ............ 709/231 |
| 2012/0324122 A1* | 12/2012 | Miles et al. .................. 709/231 |

\* cited by examiner

*Primary Examiner* — Yasin Barqadle

(57) ABSTRACT

An adaptive streaming server and a method are described herein for determining if a congestion level within a network exceeds a predetermined threshold and when this occurs then one or more lower bit rate segments of a content stream will be transmitted to a client.

16 Claims, 22 Drawing Sheets

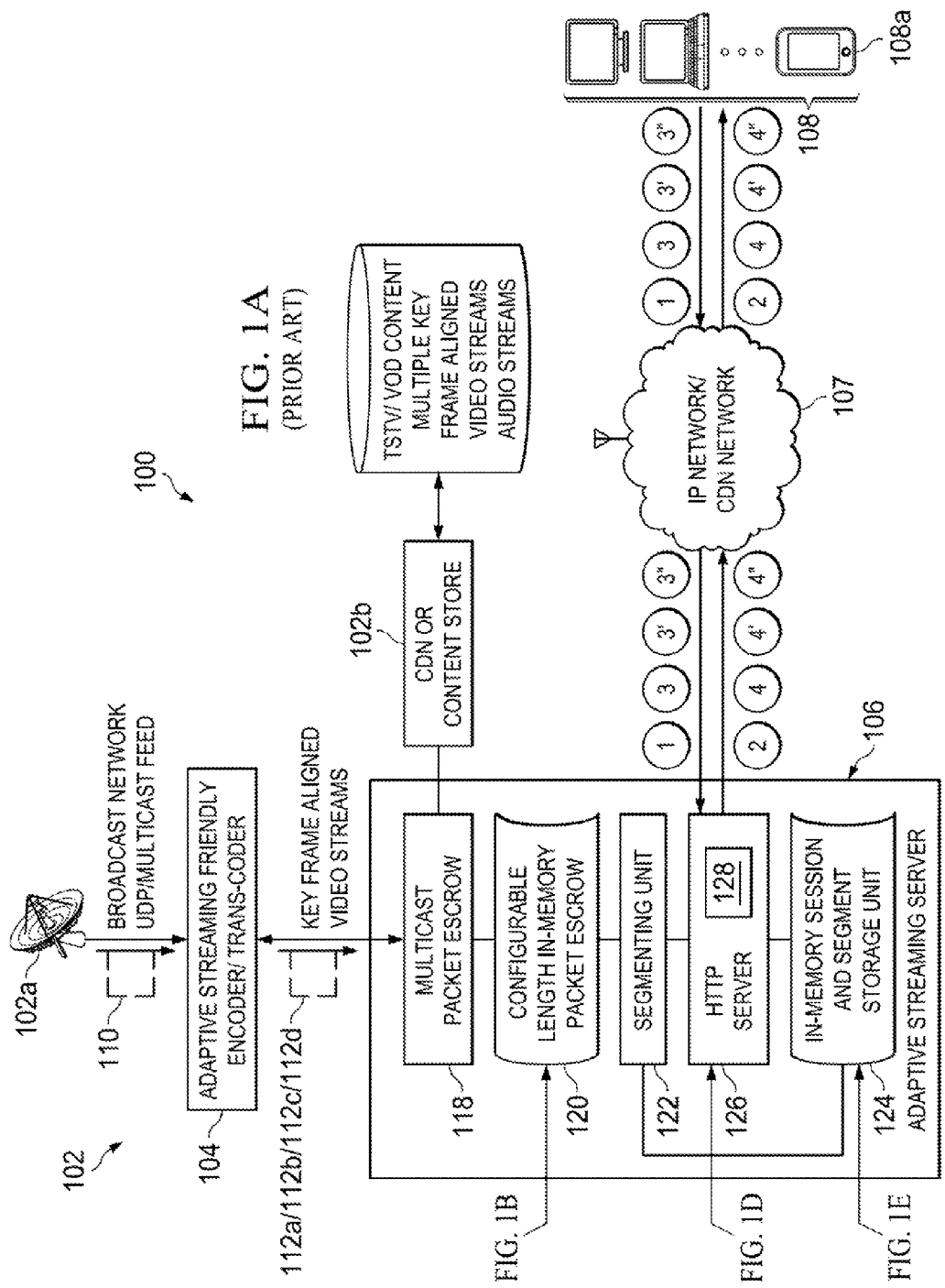

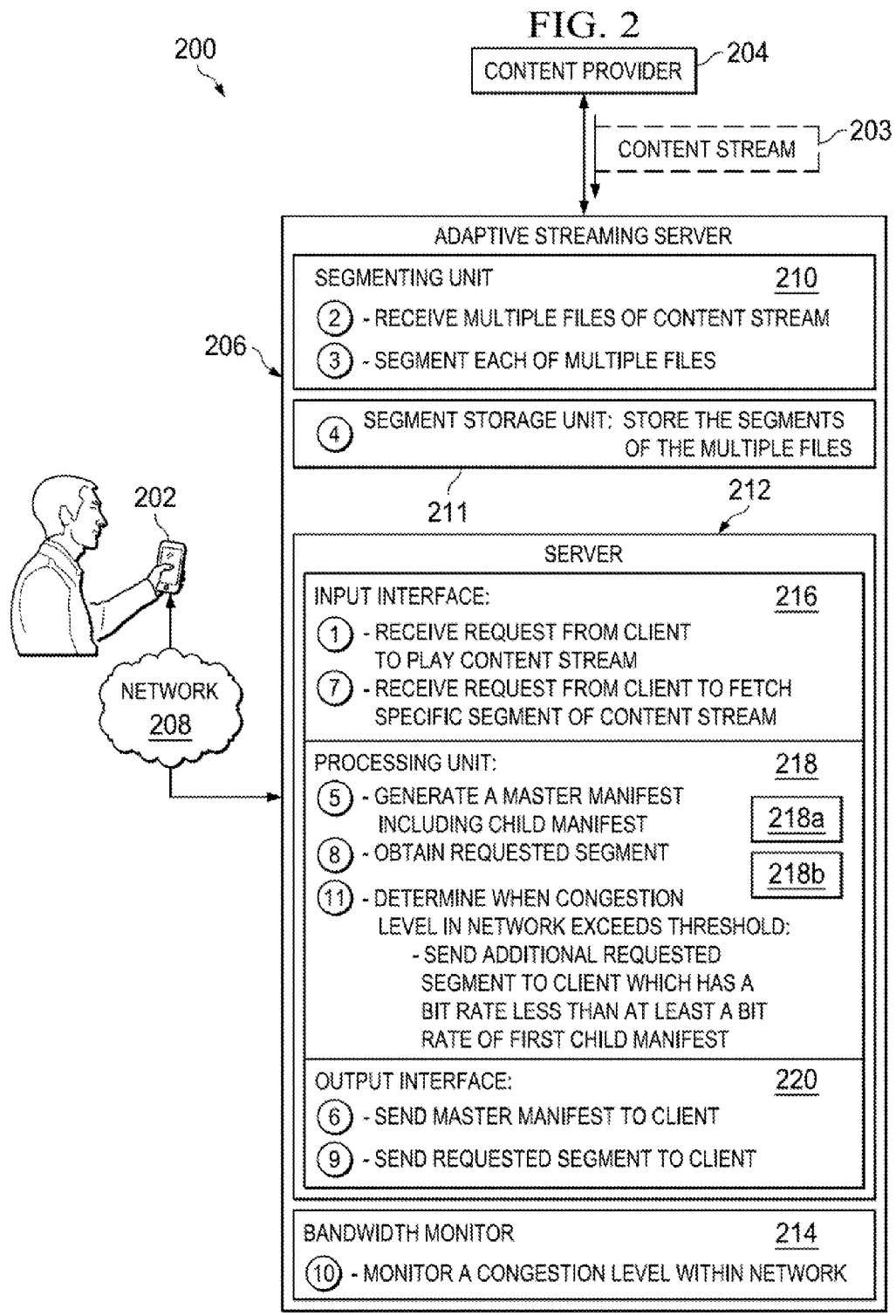

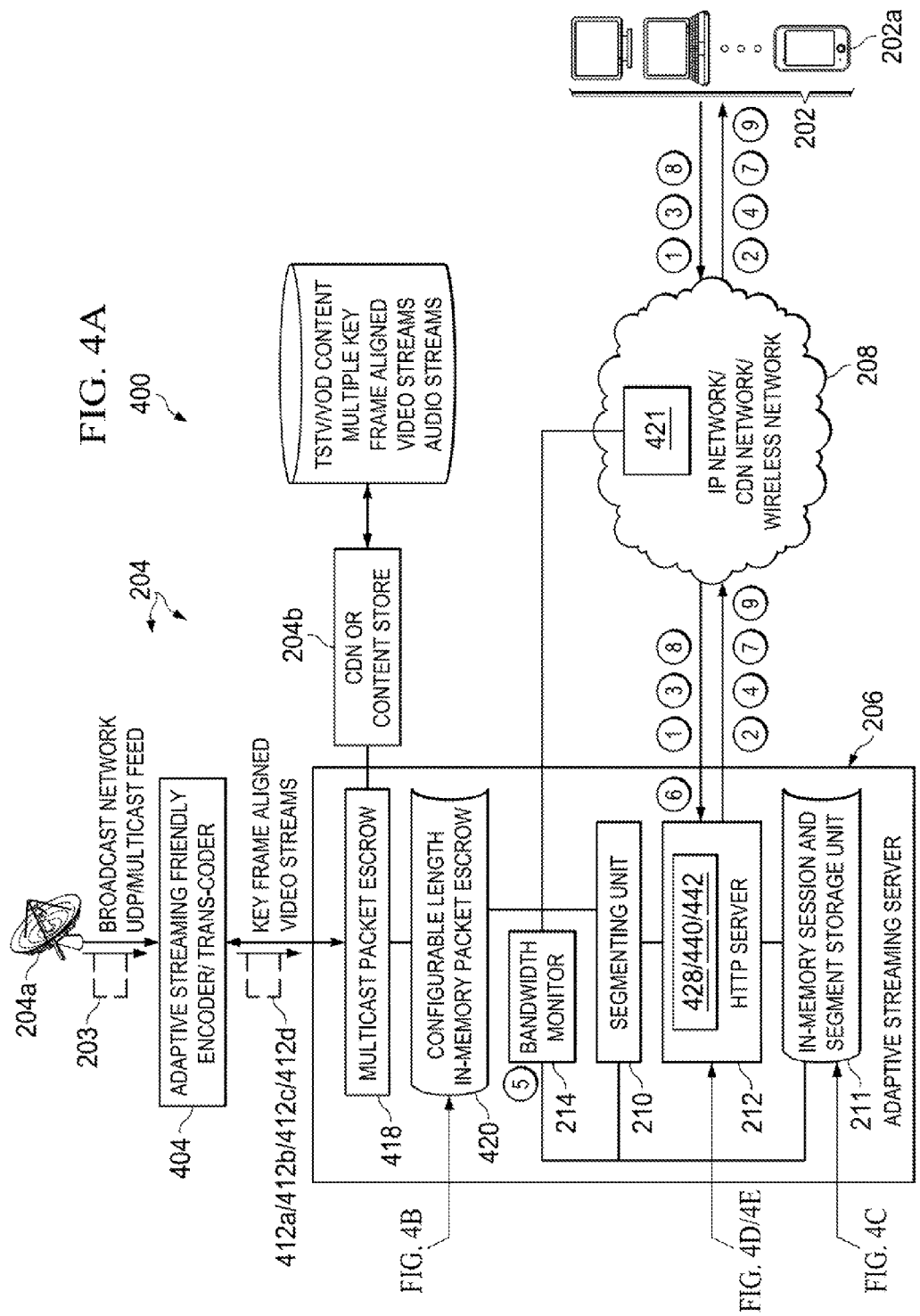

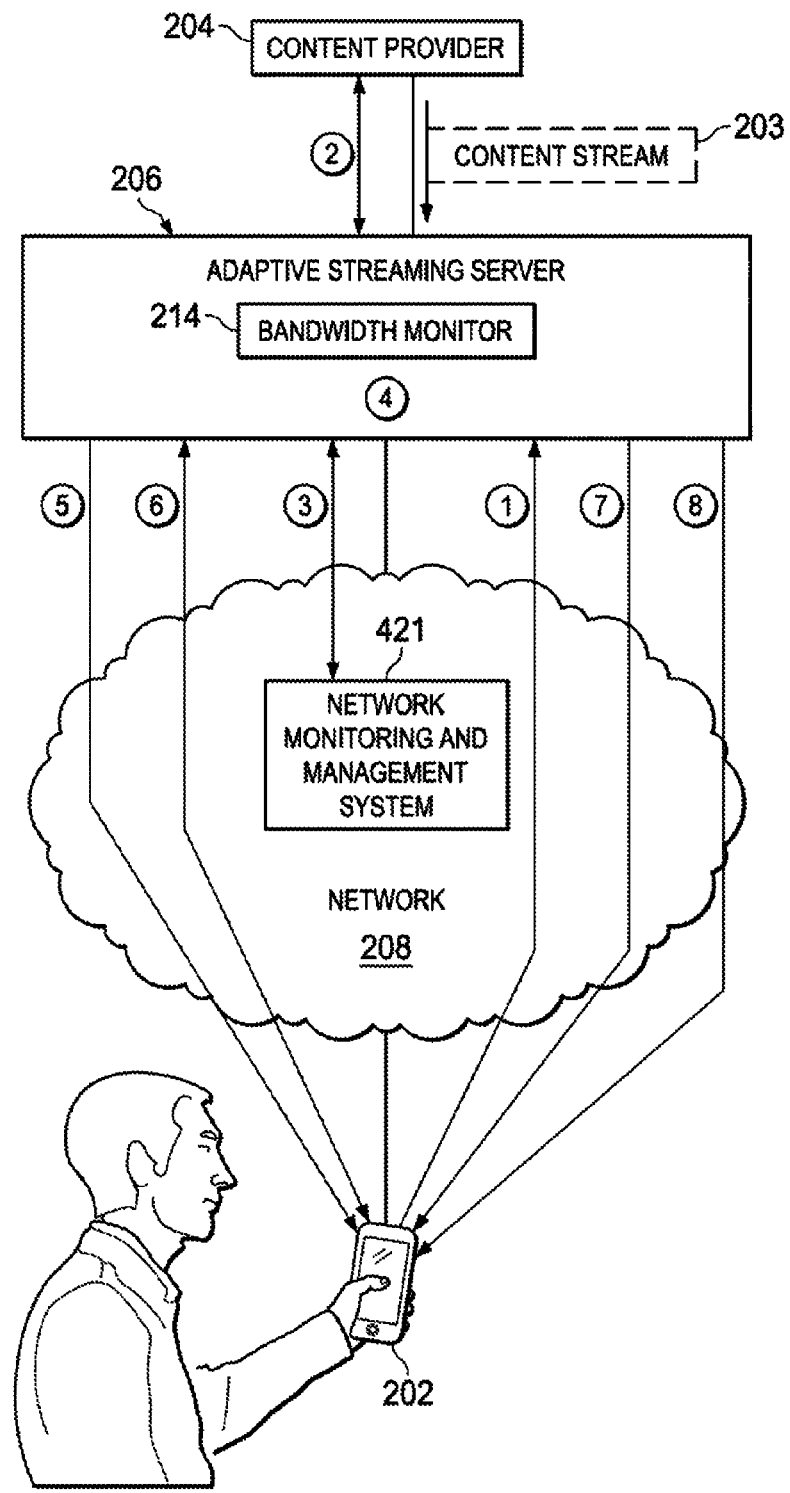

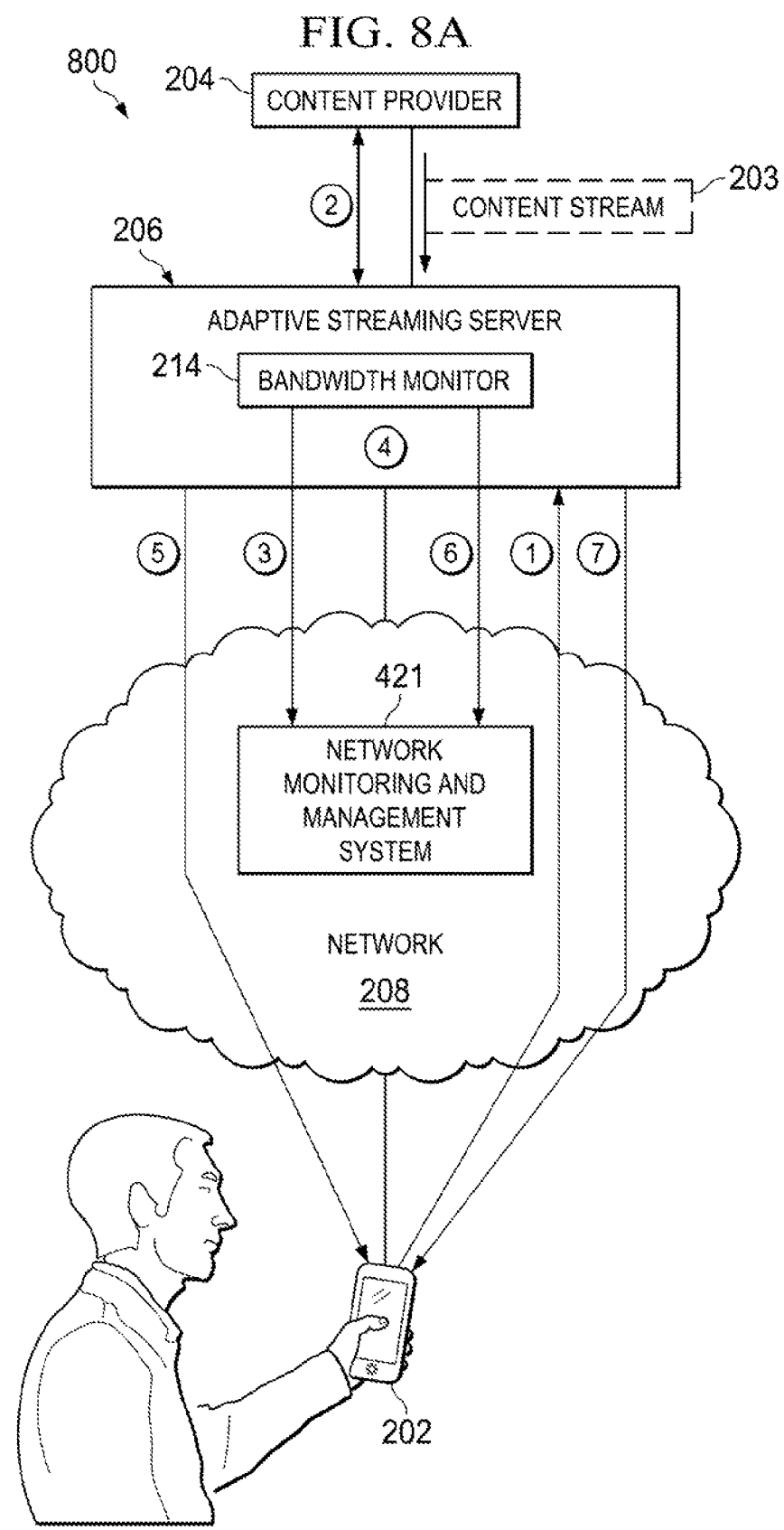

HTTP ADAPTIVE STREAMING SERVER WITH AUTOMATIC RATE SHAPING

TECHNICAL FIELD

The present invention relates to an adaptive streaming server and a method for determining if a congestion level within a network exceeds a predetermined threshold and when this occurs one or more lower bit rate segments of a content stream will be sent to a client.

BACKGROUND

The following abbreviations are herewith defined, at least some of which are referred to within the following description about at least the prior art and/or the present invention.

| HLS | HTTP Live Streaming |
|---|---|
| HTTP | Hypertext Transfer Protocol |
| IP | Internet Protocol |
| MPEG | Moving Picture Experts Group |
| MRTG | Multi Router Traffic Grapher |
| RTP | Real Time Transport Protocol |
| RTSP | Real Time Streaming Protocol |
| SNMP | Simple Network Management Protocol |

Adaptive bitrate streaming is a technique used by an adaptive streaming server for streaming multimedia over one or more networks to user devices (e.g., computers, mobile communication devices, tablets, smart phones). While in the past most video streaming technologies utilized streaming protocols such RTP with RTSP, today's adaptive streaming technologies are mostly based on HTTP and are designed to work efficiently over large distributed HTTP networks such as the Internet.

HTTP adaptive bit rate streaming requires that the adaptive streaming server have multiple files of the content stream (source video, multimedia) which are encoded at different bit rates. The adaptive streaming server then switches between streaming the different encodings of the content file based on requests received from the user's device. The result of the HTTP stream is that the user's device experiences very little buffering and a fast start time so the user has a good experience for both high-end and low-end network connections. Today, there are several HTTP adaptive bit rate streaming technologies that can be used by an adaptive streaming server for streaming multimedia over networks such as the Internet to user devices. For example, Apple's HTTP Live Stream (HLS) m3u8 file system is one such HTTP adaptive bit rate streaming technology where a "manifest" file is created to reference many video segments which are updated in real time to play in a particular order. Other HTTP adaptive bit rate streaming technologies include Adobe's Dynamic stream for Flash, Microsoft's Smooth Streaming etc. . . .

Referring to FIGS. 1A-1D (PRIOR ART), there several diagrams used to help explain how a traditional system 100 can implement a HTTP adaptive bit rate streaming technology. As shown in FIG. 1A (PRIOR ART), the traditional system 100 includes a content provider 102 (e.g., a broadcast network 102a, CDN/content store 102b), an adaptive streaming encoder/transcoder 104, an adaptive streaming server 106, a network 107 (e.g., IP network 107, CDN network 107), and clients 108. The adaptive streaming server 106 receives a request from a particular client 108a for a source video 110 and then retrieves the source video 110 from the content provider 102 (step 1). In this example, the broadcast network 102a has the requested source video 110 and provides the source video 110 to the adaptive streaming encoder/transcoder 104. The adaptive streaming encoder/transcoder 104 takes the source video 110 and generates multiple files 112a, 112b, 112c and 112d (for example) of the same video and audio content but which are encoded at different bit rates. For example, the adaptive streaming encoder/transcoder 104 can output a 4M bit rate file 112a, a 2M bit rate file 112b, a 1M bit rate file 112c and a 512K bit rate file 112d which are all key framed aligned with one another by PTSs/DTSs 114 (see FIG. 1B (PRIOR ART)). Thus, the 4M bit rate file 112a has a section 116a which contains the same video and audio content as the corresponding sections 116b, 116c and 116d of the 2M bit rate file 112b, the 1M bit rate file 112c and the 512K bit rate file 112d. However, the 4M bit rate file's section 116a has a higher quality than the 2M bit rate file's section 116b which has a higher quality than the 1M bit rate file's section 116c which in turn has a higher quality than the 512K bit rate file's section 116d.

The adaptive streaming server 106 includes a multicast packet escrow 118 which receives the multiple files 112a, 112b, 112c and 112d and a packet escrow database 120 which stores the multiple files 112a, 112b, 112c and 112d. The adaptive streaming server 106 includes a segmenting unit 122 which functions to segment each of the stored files 112a, 122b, 112c, and 112d into multiple segment files $120a_{1-n}$, $120b_{1-n}$, $120c_{1-n}$, and $120d_{1-n}$ (see FIG. 1C (PRIOR ART)). The adaptive streaming server 106 includes a segment database 124 which stores the segment files $120a_{1-n}$, $120b_{1-n}$, $120c_{1-n}$, and $120d_{1-n}$. Each segment file $120a_{1-n}$, $120b_{1-n}$, $120c_{1-n}$, and $120d_{1-n}$ contains video and audio packets for a predetermined time duration (e.g., 10 seconds). In this example, the segment files $120a_1$, $120b_1$, $120c_1$, and $120d_4$ (for example) would be associated with time codes t1-t2 and segment files $120a_4$, $120b_4$, $120c_4$, and $120d_4$ (for example) would be associated with time codes t4-t5.

The adaptive streaming server 106 has a HTTP server 126 which interfaces with the segment database 124 and creates a master manifest file 128 which includes child manifest files 130a, 130b, 130c and 130d (for example)(see FIG. 1D (PRIOR ART)). Each child manifest file 130a, 130b, 130c and 130d respectively includes references $132a_{1-n}$, $132b_{1-n}$, $132c_{1-}$, and $132d_{1-n}$ to each of the segment files $120a_{1-n}$, $120b_{1-n}$, $120c_{1-n}$, and $120d_{1-n}$. The HTTP server 126 sends the master manifest file 128 through the network 107 to client 108a (step 2). Thereafter, the client 108a sends a request including one of the child manifest file's reference $132a_1$ (for example) through the network 107 to the HTTP server 126 (step 3). The HTTP server 126 uses the requested reference $132a_1$ to retrieve and send the corresponding segment file $120a_1$ through the network 107 to the client 108a which plays the segment file $120a_1$ (step 4). The client 108a sends another request identifying one of the child manifest file's reference $132b_2$ (for example) through the network 107 to the HTTP server 126 (step 3'). The HTTP server 126 uses the requested references $132b_2$ to retrieve and send the corresponding segment file $120b_2$ through the network 107 to the client 108a which playbacks the segment file $120b_2$ (step 4'). The client 108a continues to send requests for specific segment files $120a_{3-n}$, $120b_{3-n}$, $120c_{3-n}$, and $120d_{3-n}$ (for example) and the HTTP server 126 sends the requested segment files $120a_{3-n}$, $120b_{3-n}$, $120c_{3-n}$, and $120d_{3-n}$ back to the client 108a which playbacks the received segment files $120a_{3-n}$, $120b_{3-n}$, $120c_{3-n}$, and $120d_{3-n}$ (steps 3" and 4"). In this way, the client 108a is able to playback the requested source video 110 while experiencing very little buffering and a fast start time so the user has a good experience for both high-end and low-end network connections.

However, the traditional system 100 by implementing the aforementioned HTTP adaptive bit rate streaming technology will experience a problem in which the entire or a major portion of the bandwidth of the network 107 can effectively be used-up because all of the clients 108 whenever possible will send requests to the adaptive streaming server 106 (and other adaptive streaming servers) to receive the highest quality segment files $120a_{1-n}$, rather the lower quality segment files $120b_{1-n}$, $120c_{1-n}$, and $120d_{1-n}$. Accordingly, there is a need to address this shortcoming and other shortcomings associated with the traditional system 100. This need and other needs are satisfied by the present invention.

SUMMARY

An adaptive streaming server, a method, and a system which address the aforementioned problem and other problems are described in the independent claims of the present application. Advantageous embodiments of the adaptive streaming server and the method have been described in the dependent claims of the present application.

In one aspect, the present invention provides an adaptive streaming server for transmitting a content stream through a network to a client. The adaptive streaming server comprises a server, a segmenting unit, a segment storage unit, and a bandwidth monitor. The server further comprises an input interface configured to receive a request from the client to play the content stream. The segmenting unit is configured to receive multiple files of the content stream where the multiple files are encoded at different bit rates and further configured to segment each of the multiple files into a plurality of segments. The segment storage unit is configured to store the plurality of segments. The server further comprises a processing unit configured to generate a master manifest that includes a plurality of child manifests, wherein the first child manifest has references to the segments having a first bit rate, the second child manifest has references to the segments having a second bit rate, and the third child manifest has references to the segments having a third bit rate, and wherein the first bit rate is higher than the second bit rate which is higher than the third bit rate. The server further comprises an output interface configured to send the master manifest to the client. The server's input interface is configured to receive a request from the client to fetch a specific one of the segments corresponding to the content stream. The server's processing unit is configured to obtain the requested segment from the segment storage unit. The server's output interface is configured to send the requested segment to the client. The bandwidth monitor is configured to monitor a congestion level within the network. The server's processing unit is configured to determine if the congestion level within the network exceeds a predetermined threshold and when this occurs is further configured to send an additional requested segment to the client where the sent additional requested segment has a bit rate that is less than at least the first bit rate associated with the first child manifest. The adaptive streaming server has an advantage in that is can lessen the impact on the network during peak utilization times when providing video to their customers.

In yet another aspect, the present invention provides a method implemented by an adaptive streaming server for transmitting a content stream through a network to a client. The method comprises the steps of: (a) receiving a request from the client to play the content stream; (b) receiving multiple files of the content stream where the multiple files are encoded at different bit rates; (c) segmenting each of the multiple files into a plurality of segments; (d) storing the plurality of segments; (e) generating a master manifest that includes a plurality of child manifests, wherein the first child manifest has references to the segments having a first bit rate, the second child manifest has references to the segments having a second bit rate, and the third child manifest has references to the segments having a third bit rate, and wherein the first bit rate is higher than the second bit rate which is higher than the third bit rate; (f) sending the master manifest to the client; (g) receiving a request from the client to fetch a specific one of the segments corresponding to the content stream; (h) obtaining the requested segment from the segment storage unit; (i) sending the requested segment to the client; (j) monitoring a congestion level within the network; and (k) determining if the congestion level within the network exceeds a predetermined threshold and when this occurs then sending an additional requested segment to the client where the sent additional requested segment has a bit rate that is less than at least the first bit rate associated with the first child manifest. The method has an advantage in that is can lessen the impact on the network during peak utilization times when providing video to their customers.

In still yet another aspect, the present invention provides a system for providing a content stream through a network to a client. The system comprises a content provider and an adaptive streaming server. The adaptive streaming server is configured to: (a) receive a request from the client to play the content stream; (b) receive multiple files of the content stream provided by the content provider where the multiple files are encoded at different bit rates; (c) segment each of the multiple files into a plurality of segments; (d) store the plurality of segments; (e) generate a master manifest that includes a plurality of child manifests, wherein the first child manifest has references to the segments having a first bit rate, the second child manifest has references to the segments having a second bit rate, and the third child manifest has references to the segments having a third bit rate, and wherein the first bit rate is higher than the second bit rate which is higher than the third bit rate; (f) send the master manifest to the client; (g) receive a request from the client to fetch a specific one of the segments corresponding to the content stream; (h) obtain the requested segment from the segment storage unit; (i) send the requested segment to the client; (j) monitor a congestion level within the network; and (k) determine if the congestion level within the network exceeds a predetermined threshold and when this occurs is further configured to send an additional requested segment to the client where the sent additional requested segment has a bit rate that is less than at least the first bit rate associated with the first child manifest. The system has an advantage in that is can lessen the impact on the network during peak utilization times when providing video to their customers.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIGS. 1A-1D (PRIOR ART) are several diagrams used to help explain how a traditional system can provide a content stream through a network to a client;

FIG. 2 is a diagram of an exemplary system configured to provide a content stream through a network to a client in accordance with an embodiment of the present invention;

FIGS. 4A-4E are several diagrams used to help explain how an exemplary system including an adaptive streaming server can be configured to provide a content stream through a network to a client in accordance with an embodiment of the present invention;

FIGS. 5A-5B are two diagrams used to help explain how an exemplary system including an adaptive streaming server can be configured to provide a content stream through a network to a client in accordance with an embodiment of the present invention;

FIGS. 8A-8C are several diagrams used to help explain how an exemplary system including an adaptive streaming server can be configured to provide a content stream to a client in accordance with an embodiment of the present invention.

DETAILED DESCRIPTION

Figure 1B:
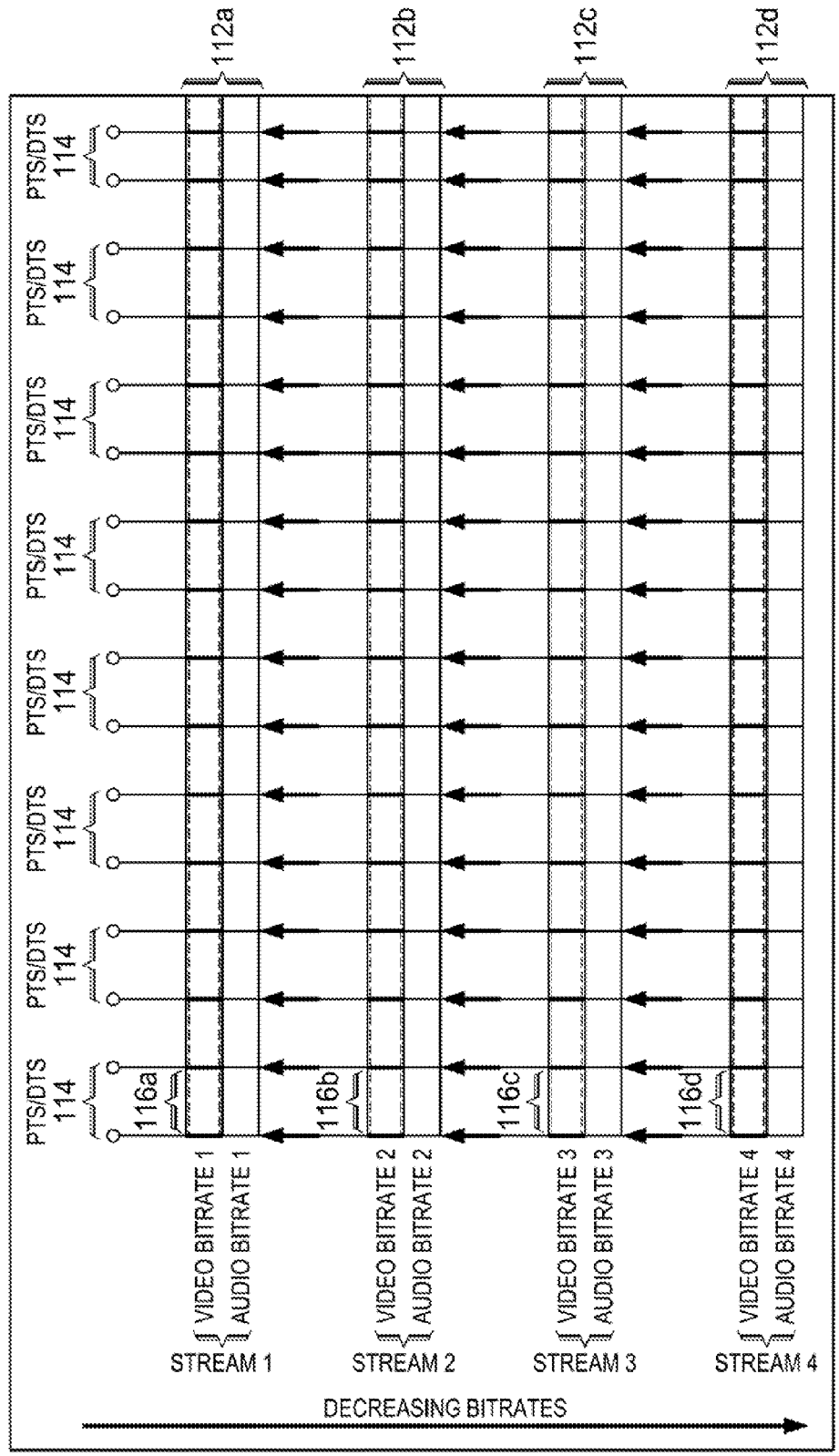
Figure 1C:
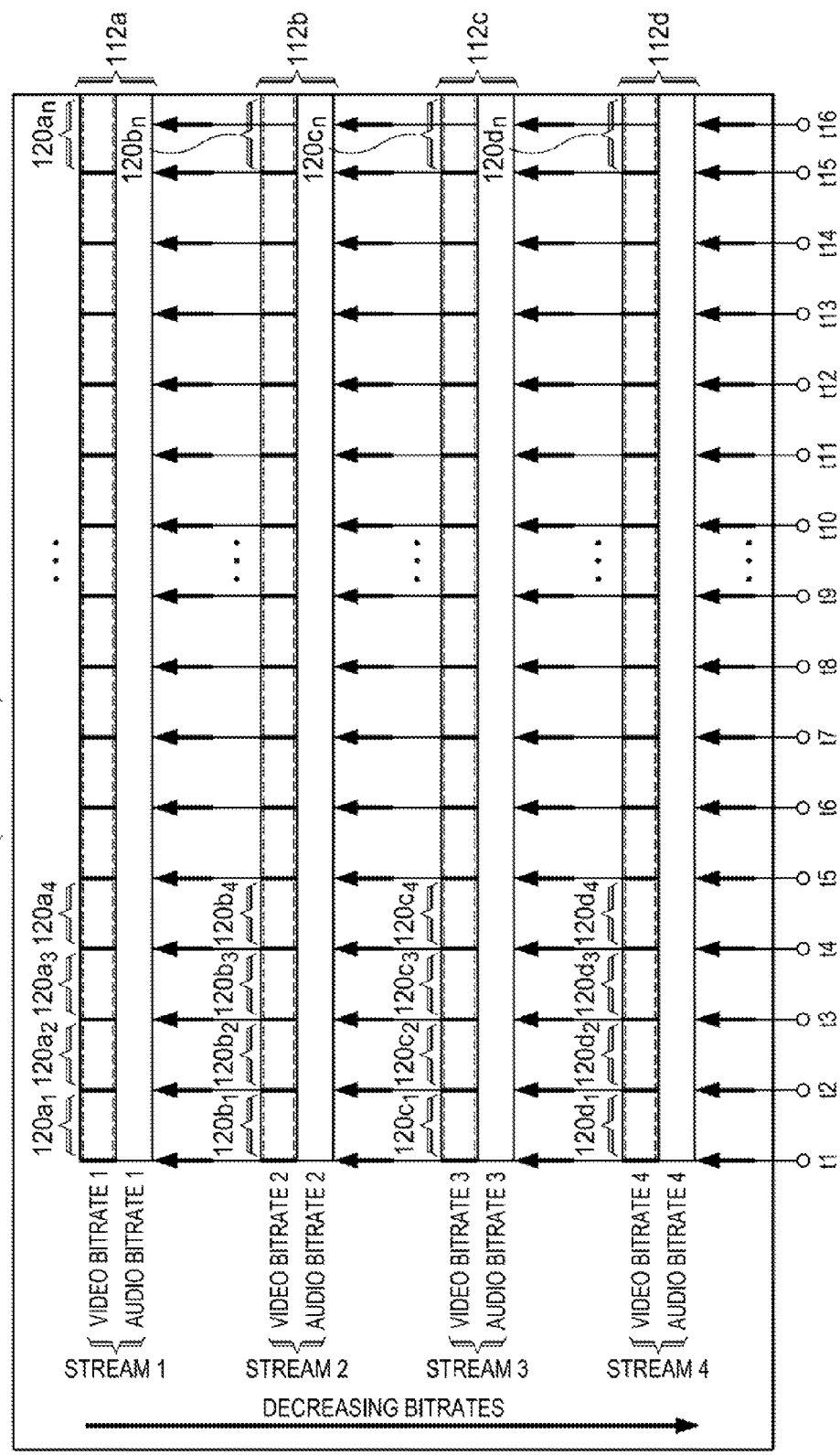
Figure 1D:
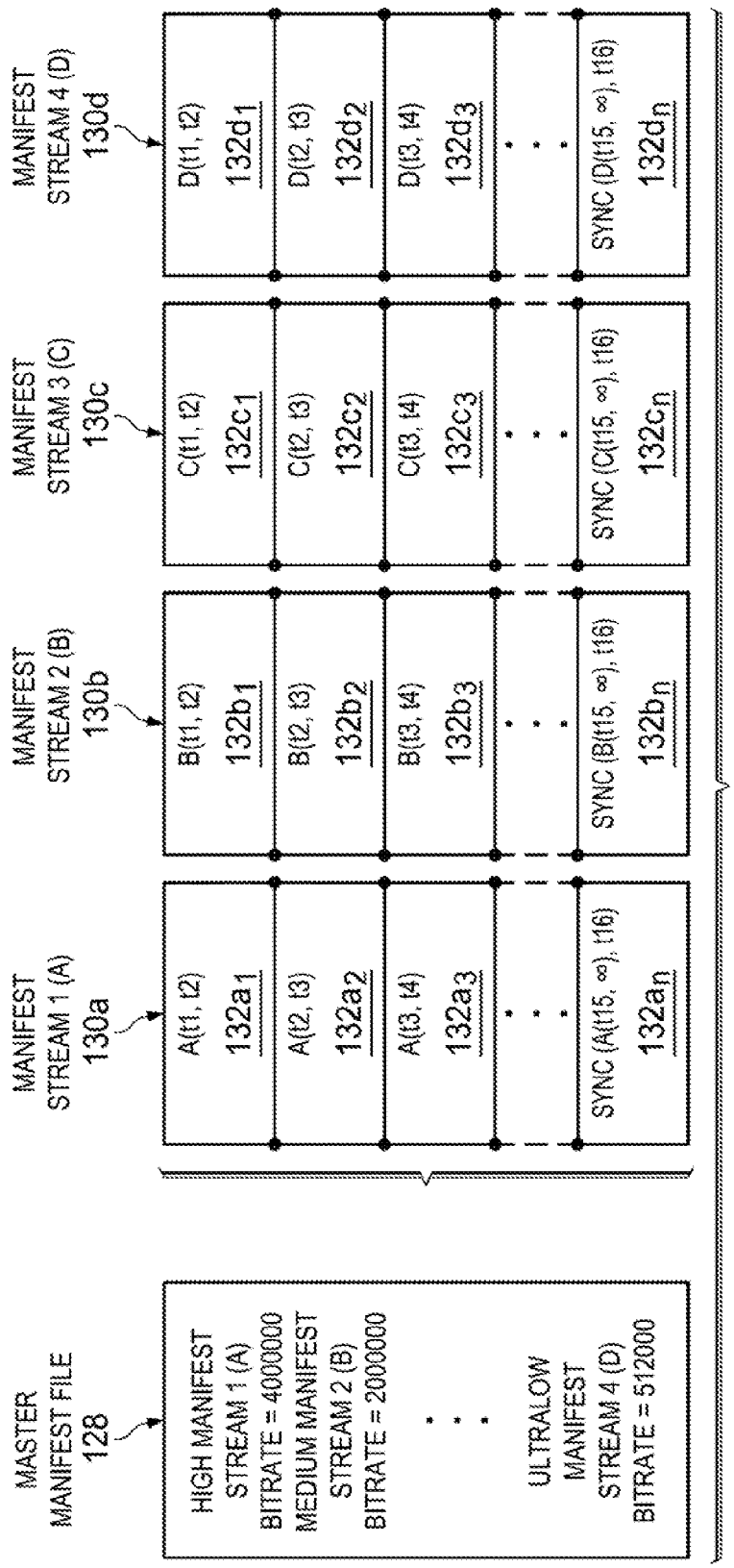

Referring to FIG. 2, there is a diagram of an exemplary system 200 configured to provide a content stream 203 through a network 208 to a client 202 in accordance with an embodiment of the present invention. The system 200 includes a content provider 204 and an adaptive streaming server 206. (e.g., IP network 208, CDN network 208, wireless network 208 or any combination thereof). The content provider 204 interfaces with the adaptive streaming server 206 which in turn interfaces with the client 202 (only one shown) through the network 208 (e.g., IP network 208, CDN network 208, wireless network 208 or any combination thereof). Alternatively, the content provider 204 may be connected to the adaptive streaming server 206 through the network 208. The adaptive streaming server 206 is configured to determine if a congestion level within the network 208 exceeds a predetermined threshold and when this occurs preventing the client 202 (e.g., personal computer 202, a mobile phone 202 (shown), a tablet 202, or a HTTP capable television 202) from requesting high bit rate segments of a content stream 203 or if the client 202 requests high bit rate segments of the content stream 203 then sending the corresponding lower bit rate segments of the content stream 203.

As shown, the adaptive streaming server 206 includes a segmenting unit 210, a segment storage unit 211, a server 212 (e.g., HTTP server 212), and a bandwidth monitor 214. The server 212 further includes an input interface 216, a processing unit 218, and an output interface 220. In this example, the processing unit 218 includes a processor 218a which executes process-executable instructions stored in a memory 218a to enable the operations described below. The input interface 216 is configured to receive a request from the client 202 to play the content stream 203 (step 1). The segmenting unit 210 is configured to receive multiple files of the content stream 203 where the multiple files are encoded at different bit rates (step 2). For example, the content provider 204 (e.g., CDN content store 204) may provide the multiple files of the content stream 203. Or, the content provider 204 (e.g., broadcast network 204a) may provide a single file of the content stream 203 to an adaptive streaming friendly encoder/transcoder which then generates the multiple files of the content stream 203 and provides the multiple files to the segmenting unit 210 (e.g., see FIG. 4A). The segmenting unit 210 is further configured to segment each of the multiple files into a plurality of segments (step 3). The segment storage unit 211 (e.g., volatile memory, non-volatile memory) is configured to store the segments of the multiple files of the content stream 203 (step 4). The processing unit 218 is configured to generate a master manifest (e.g., master manifest file) that includes a plurality of child manifests (e.g., child manifest files) (step 5). For example, the first child manifest has references to the segments (e.g., segment files, data structures) of the first file having a first bit rate, the second child manifest has references to the segments of the second file having a second bit rate, and the third child manifest has references to the segments of the third file having a third bit rate etc. . . . where the first bit rate is higher than the second bit rate which is higher than the third bit rate etc. . . . The output interface 220 is configured to send the master manifest to the client 202 (step 6). The input interface 216 is configured to receive a request from the client 203 to fetch a specific one of the segments corresponding to the content stream 203 (step 7). The processing unit 218 is configured to obtain the requested segment from the segment storage unit 211 (step 8). The output interface 220 is configured to send the requested segment to the client 202 (step 9). The bandwidth monitor 214 is configured to monitor a congestion level within the network 20 (step 10). The processing unit 218 is configured to determine if the congestion level within the network 208 exceeds a predetermined threshold and when this occurs is further configured to send an additional requested segment to the client 202 where the sent additional requested segment has a bit rate that is less than at least the first bit rate associated with the first child manifest (step 11).

Figure 3:
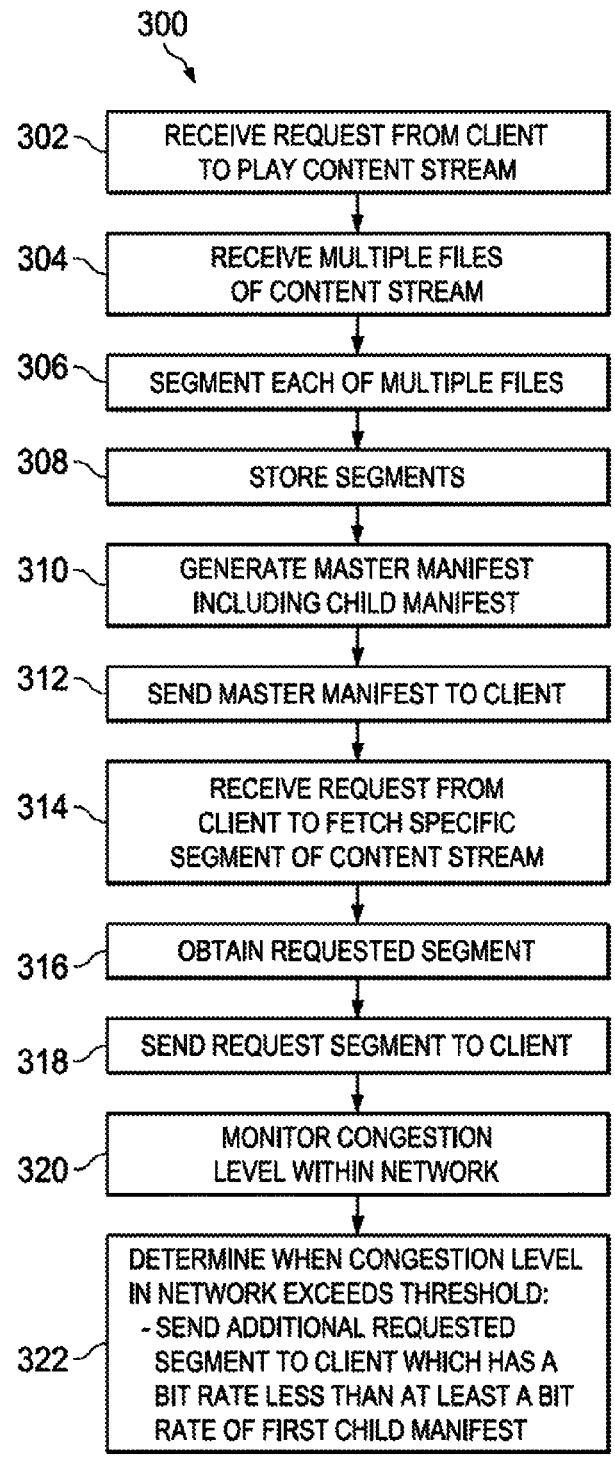
FIG. 3 is a flowchart illustrating the steps of an exemplary method implemented by an adaptive streaming server to provide a content stream through a network to a client in accordance with an embodiment of the present invention.

Referring to FIG. 3, there is a flowchart illustrating the steps of an exemplary method 300 implemented by the adaptive streaming server 206 to provide the content stream 203 through the network 208 to the client 202 in accordance with an embodiment of the present invention. At step 302, the adaptive streaming server 206 receives a request from the client 202 to play the content stream 203. At step 304, the adaptive streaming server 206 receives multiple files of the content stream 203 where the multiple files are encoded at different bit rates. For example, the content provider 204 (e.g., CDN content store 204) may provide the multiple files of the content stream 203. Or, the content provider 204 (e.g., broadcast network 204) may provide a single file of the content stream 203 to an adaptive streaming friendly encoder/transcoder which then generates the multiple files of the content stream 203 and provides the multiple files to the segmenting unit 210. At step 306, the adaptive streaming server 206 segments each of the multiple files into a plurality of segments. At step 308, the adaptive streaming server 206 stores the segments of the multiple files of the content stream 203. At step 310, the adaptive streaming server 206 generates a master manifest (e.g., master manifest file) that includes a plurality of child manifests (e.g., child manifest files). For example, the first child manifest has references to the segments (e.g., segment files, data structures) of the first file having a first bit rate, the second child manifest has references to the segments of the second file having a second bit rate, and the third child manifest has references to the segments of the third file having a third bit rate etc. . . . where the first bit rate is higher than the second bit rate which is higher than the third bit rate. . . . At step 312, the adaptive streaming server 206 sends the master manifest to the client 202. At step 314, the adaptive streaming server 206 receives a request from the client 203 to fetch a specific one of the segments corresponding to the content stream 203. At step 316, the adaptive streaming server 206 obtains the requested segment from the segment storage unit 211. At step 318, the adaptive streaming server 206 sends the requested segment to the client 202. At step 320, the adaptive streaming server 206 monitors a congestion level within the network 208. At step 322, the adaptive streaming server 206 determines if the congestion level within the network 208 exceeds a predetermined threshold and when this occurs is further configured to send an additional requested segment to the client 202 where the sent additional requested segment has a bit rate that is less than at least the first bit rate associated with the first child manifest. A detailed discussion about several exemplary ways that the adaptive streaming server 206 can implement the aforementioned method 300 and in particular step 322 (or step 11 in FIG. 2) is provided below with respect to FIGS. 4-8.

Figure 4B:
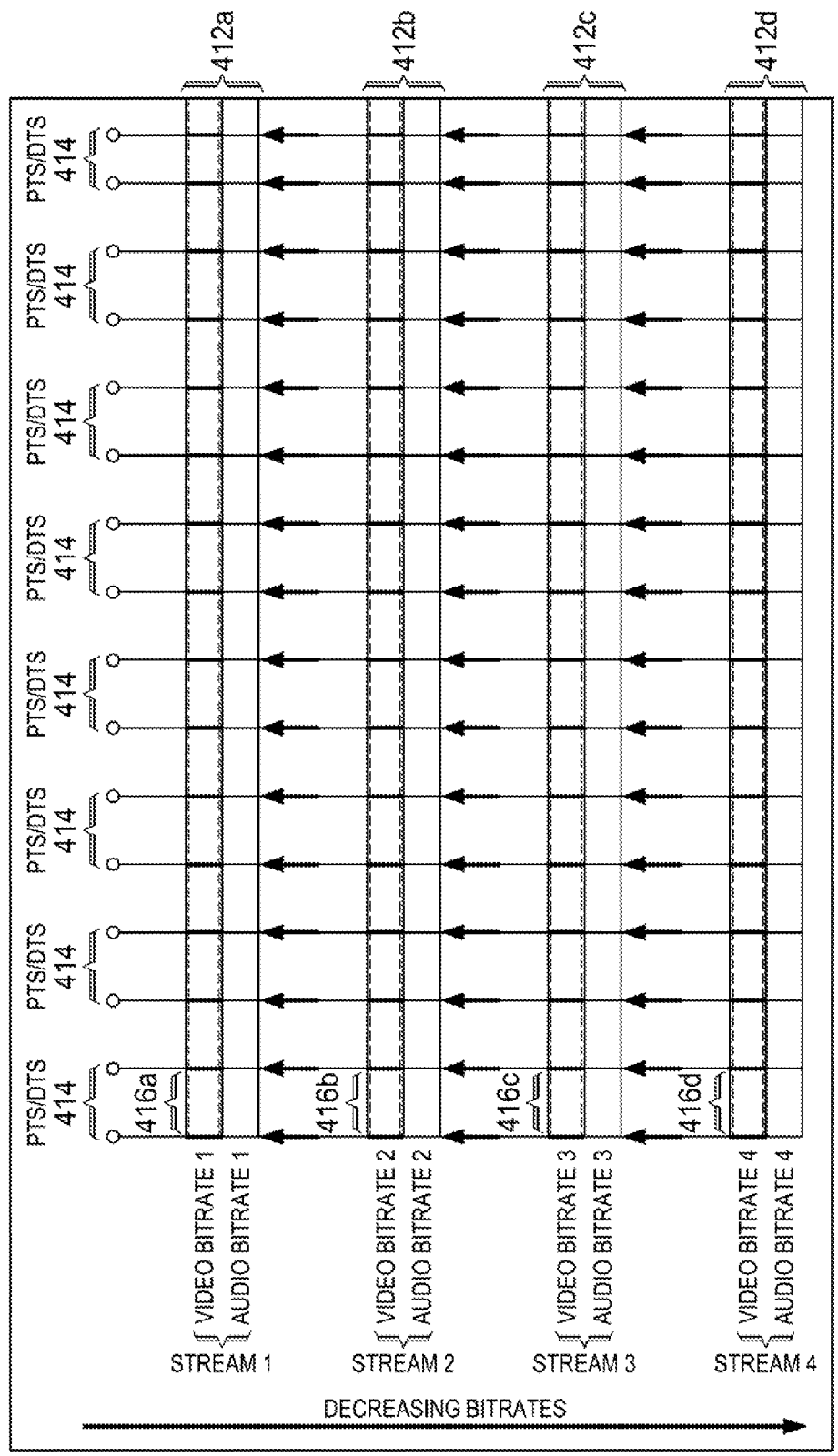
Figure 4C:
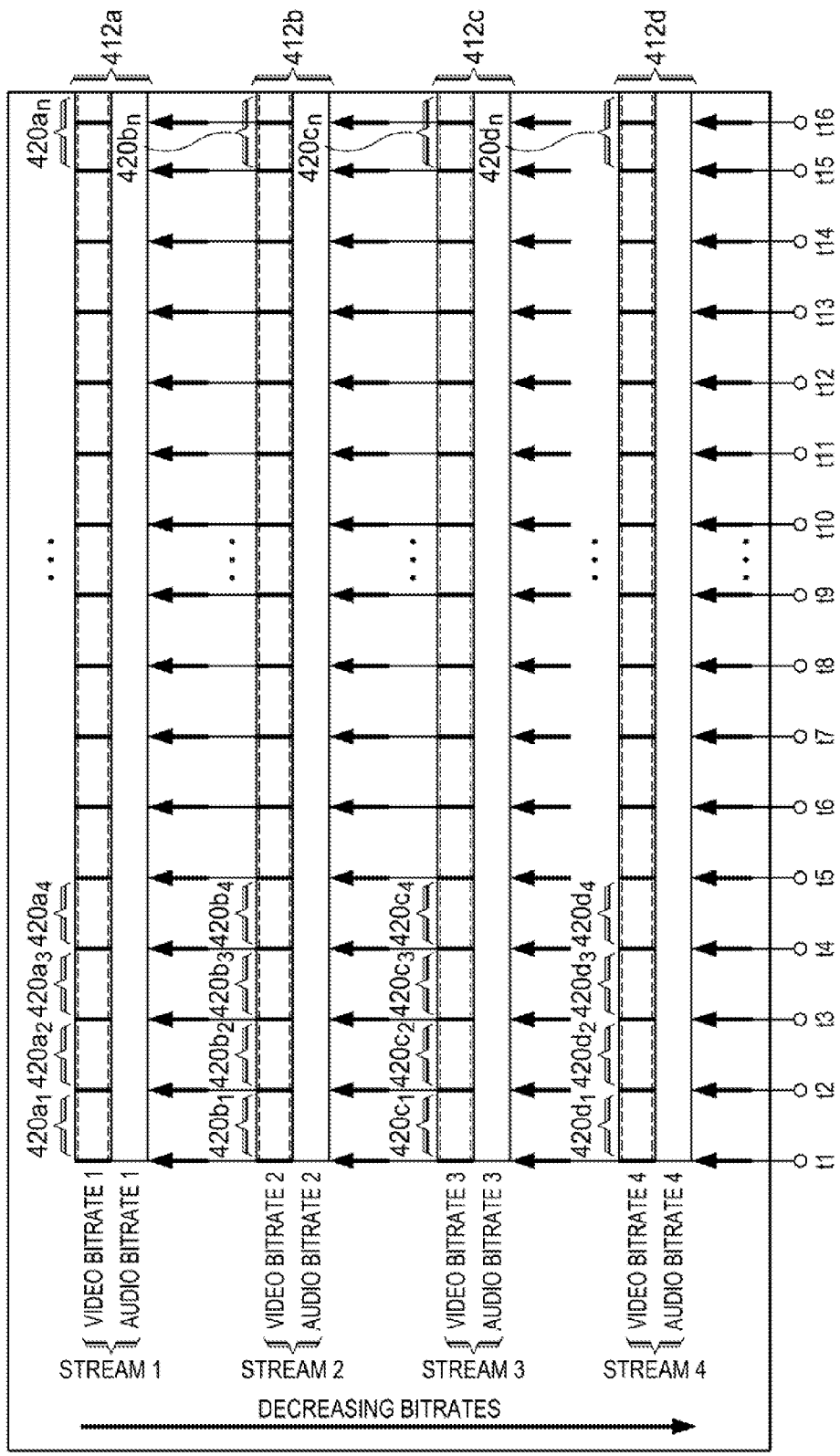

Referring to FIGS. 4A-4E, there several diagrams used to help explain how an exemplary system 400 can be configured to provide a content stream 203 through a network 208 to a client 202 in accordance with an embodiment of the present invention. As shown in FIG. 4A, the system 400 includes a content provider 204 (e.g., a broadcast network 204a, CDN content store 204b), an adaptive streaming encoder/transcoder 404, an adaptive streaming server 206, a network 208 (e.g., IP network 208, CDN network 208, wireless network 208 or any combination thereof), and clients 202. The adaptive streaming server 206 receives a request from a particular client 202a for a source video 203 and then retrieves the source video 203 from the content provider 204 (step 1). In this example, the broadcast network 204a has the requested source video 203 and provides the source video 203 to the adaptive streaming encoder/transcoder 404. The adaptive streaming encoder/transcoder 404 takes the source video 203 and generates multiple files 412a, 412b, 412c and 412d (for example) of the same video and audio content but which are encoded at different bit rates. For example, the adaptive streaming encoder/transcoder 404 outputs a 4M bit rate file 412a, a 2M bit rate file 412b, a 1M bit rate file 412c and a 512K bit rate file 412d which are all key framed aligned with one another by PTSs/DTSs 414 (see FIG. 4B). Thus, the 4M bit rate file 412a has a section 416a which contains the same video and audio content as the corresponding sections 416b, 416c and 416d of the 2M bit rate file 412b, the 1M bit rate file 412c and the 512K bit rate file 412d. However, the 4M bit rate file's section 416a is a higher quality than the 2M bit rate file's section 416b which has a higher quality than the 1M bit rate file's section 416c which in turn has a higher quality than the 512K bit rate file's section 416c.

The adaptive streaming server 206 includes a multicast packet escrow 418 which receives the multiple files 412a, 412b, 412c and 412d and a packet escrow database 420 which stores the multiple files 412a, 412b, 412c and 412d. The adaptive streaming server 206 includes a segmenting unit 211 which functions to segment each of the stored files 412a, 422b, 412c, and 412d into multiple segments $420a_{1-n}$, $420b_{1-n}$, $420c_{1-n}$, and $420d_{1-n}$, (see FIG. 4C). The adaptive streaming server 206 includes a segment storage unit 211 which stores the segments $420a_{1-n}$, $420b_{1-n}$, $420c_{1-n}$, and $420d_{1-n}$. Each segment $420a_{1-n}$, $420b_{1-n}$, $420c_{1-n}$, and $420d_{1-n}$ contains video and audio packets for a predetermined time duration (e.g., 10 seconds). In this example, the segments $420a_1$, $420b_1$, $420c_1$, and $420d_1$ (for example) would be associated with time codes t1-t2 and segments $420a_4$, $420b_4$, $420c_4$, and $420d_4$ (for example) would be associated with the time codes t4-t5.

Figure 4D:
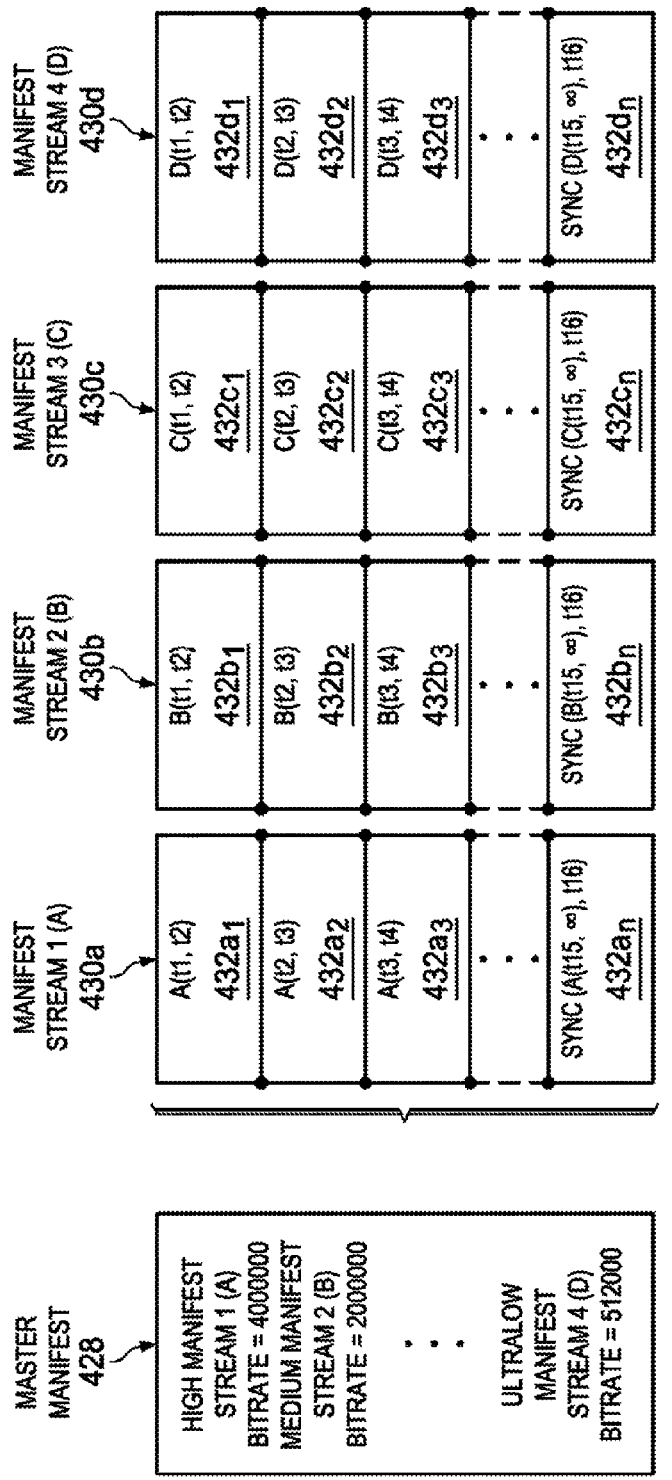
Figure 4E:
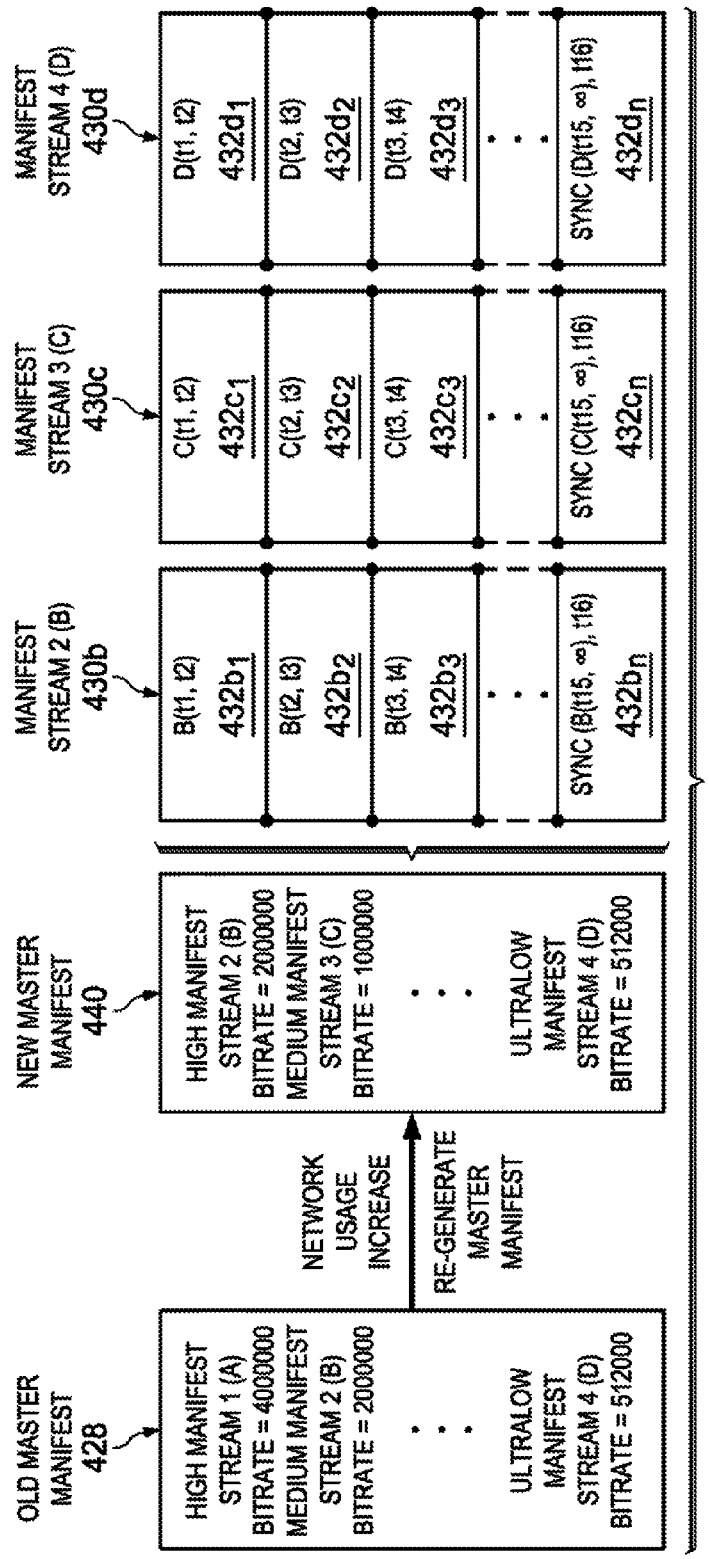

The adaptive streaming server 206 has a HTTP server 212 which interfaces with the segment storage unit 211 and creates a master manifest 428 which includes child manifests 430a, 430b, 430c and 430d (for example) (see FIG. 4D). Each child manifest 430a, 430b, 430c and 430d respectively includes references $432a_{1-n}$, $432b_{1-n}$, $432c_{1-n}$, and $432d_{1-n}$ to each of the segments $420a_{1-n}$, $420b_{1-n}$, $420c_{1-n}$, and $420d_{1-n}$. The HTTP server 212 sends the master manifest 428 through the network 208 to client 202a (step 2). Thereafter, the to client 202a sends a request including one of the child manifest's reference $432a_1$ (for example) through the network 107 to the HTTP server 212 (step 3). The HTTP server 212 uses the requested reference $432a_1$ to retrieve and send the corresponding segment $420a_1$ through the network 208 to the client 202a which plays the segment $420a_1$ (step 4). In the past, the client 202a would likely continue to send requests for the highest quality segments $420a_{2-n}$ and the HTTP server 212 would send the requested highest quality segments $420a_{2-n}$ back to the client 202a. However, if this was allowed to occur then a major portion if not all of the bandwidth of the network 208 would effectively be used-up because all of the clients 202 whenever possible would send requests to the adaptive streaming server 206 to receive the highest quality segments $420a_{1-n}$ rather than the lower quality segments $420b_{1-n}$, $420c_{1-n}$, and $420d_{1-n}$.

To overcome this problem, the adaptive streaming server 206 is adapted to incorporate a bandwidth monitor 214 which is configured to monitor a congestion level within the network 208 by for example interfacing with a network monitoring and management system 421 (step 5). Then, the adaptive streaming server 206 (e.g., processing unit 218) is configured to determine if the congestion level within the network 208 exceeds a predetermined threshold and when this occurs is further configured to prevent the client 202a from requesting the segments $420a_{2-n}$ associated with the first child manifest 430a (step 6). In particular, the adaptive streaming server 206 (e.g., processing unit 418) is configured to generate an updated master manifest 440 that for example does not include the first child manifest 430a but does include the other child manifests 430b, 430c and 430d (see FIG. 4E). The adaptive streaming server 206 (e.g., output interface 220) is configured to send the updaged master manifest 440 along with an indicator 442 to the client 202a (step 7). The indicator 442 indicates that the updated master manifest 440 is to replace the previously sent master manifest 428. Thereafter, the adaptive streaming server 206 (e.g., input interface 216) is configured to receive another request from the client 202a to fetch a specific one of the segments $420b_{2-n}$, $204c_{2-n}$, and $420d_{2-n}$, associated with the child manifests 430b, 430c and 430d (step 8). The adaptive streaming server 206 (e.g., processing unit 218) is configured to obtain the requested segment $420b_2$ (for example) from the segment storage unit 211. The adaptive streaming server 206 (e.g., output interface 220) is configured to send the requested segment $420b_2$ to the client 202a which playbacks the requested segment $420b_2$ (step 9). The adaptive streaming server 206 would continue to monitor the congestion level of the network 208 and depending on the monitored congestion level continue to generate and forward new master manifest file(s) to the client 202a. This is a marked improvement over the prior art in that the client 202a depending on the congestion level of the network 208 may be prevented from requesting segments of the content stream 203 which have a bit rate that is considered too high in view of the current congestion level of the network 208.

Figure 5B:
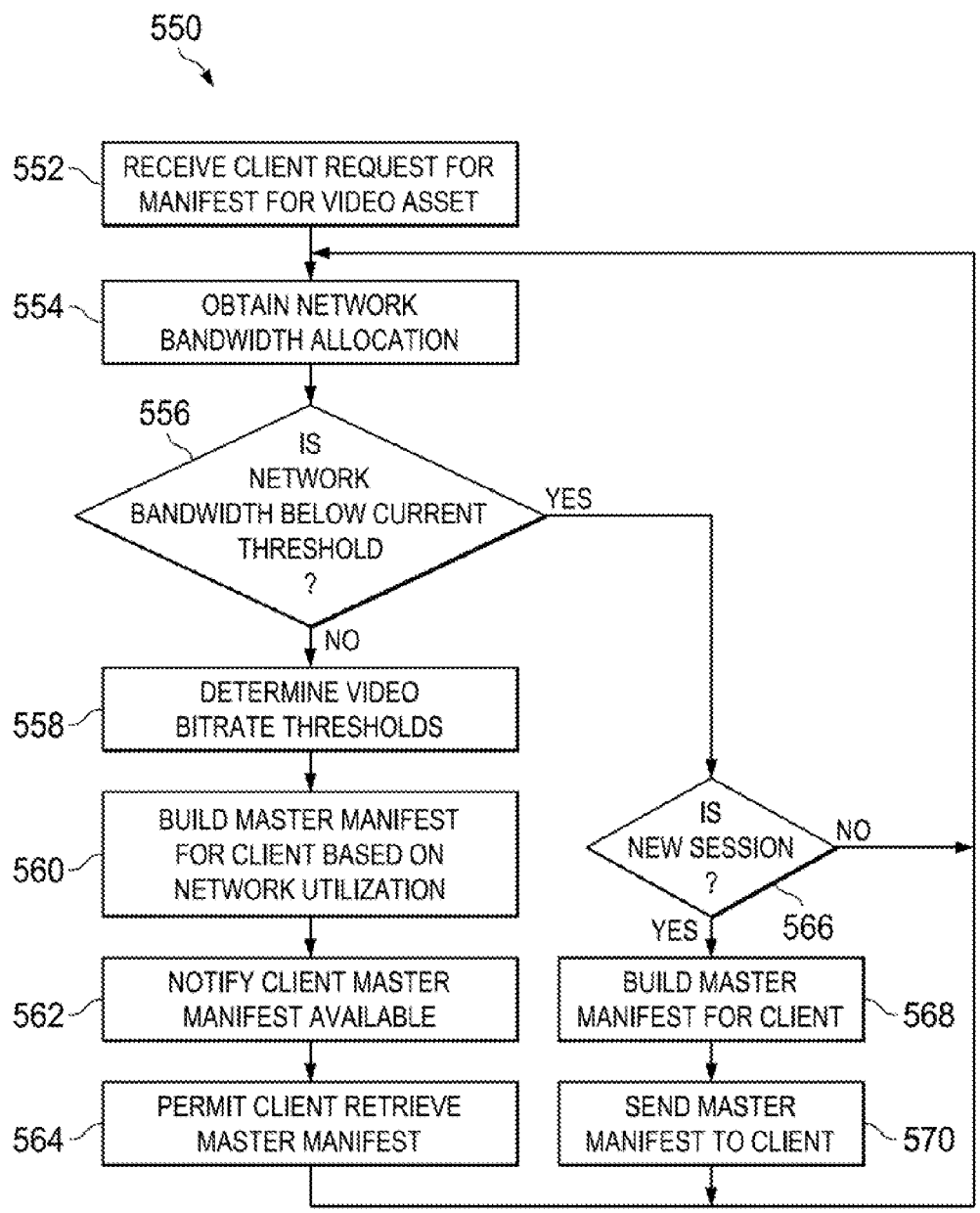

Referring to FIGS. 5A-5B, there are two diagrams used to help explain how an exemplary adaptive streaming server 206 can be configured to provide a content stream 203 through a network 208 to one or more clients 202 (only one shown) in accordance with an embodiment of the present invention. In FIG. 5A, there is a diagram illustrating the exemplary signaling that can take place between the adaptive streaming server 206; the client 202, and a content provider 204 through a network 208 such that the adaptive streaming server 206 depending on the congestion level of the network 208 can prevent the client 202 from requesting segments of the content stream 203 which have a bit rate that is considered too high in view of the current congestion level of the network 208. For example, when the client 202 requests to receive the content stream 203 the adaptive streaming server's bandwidth monitor 204 "calls out" to a third party service or device via SNMP or other protocols such as web services to MRTG devices, switches, network management systems or other systems associated with the network 208 to determine the overall "health" and current utilization of the network 208. If the network utilization is under some configurable amount, then the adaptive streaming server 206 constructs a master manifest (index file) to be used with HTTP adaptive streaming which includes all of the available encodings at all of the available bitrates for the requested content stream 203 (video asset 203). If the network utilization is high or nearing some configurable threshold, then the adaptive streaming server 206 will construct a master manifest (index file) which excludes the highest encoded bitrates. Further, when the network utilization is high, the adaptive streaming server 206 instructs the client 202 (only one shown) via polling or notification to retrieve a new master manifest which forces the client 202 to switch to a lower bit rate stream. The exemplary signaling that can take place between the components 206, 208, 202 and 204 are as follows:

1. The client 202 sends a request to play a content stream 203 where the request is received by the adaptive streaming server 206. For example, the content stream 203 can be a live, broadcast, or time shifted video or VOD asset.
2. The adaptive streaming server 206 retrieves the requested content stream 203 from the content provider 204.
3. The adaptive streaming server's bandwidth monitor 214 checks the network utilization (congestion level) by interfacing with a Network Monitoring and Management System 421 associated with the network 208 via standard communication such as web services, SNMP web services or other messaging.
4. When the bandwidth availability or network utilization information is returned from the Network Monitoring and Management System 421, then the adaptive streaming server 206 generates the master manifest which is sent to the client 202. The adaptive streaming server 206 when generating the master manifest takes into account the overall bandwidth availability or network utilization and if desired the number of clients 202 playing the content stream 203.
5. The master manifest is returned to the client 202 which uses the master manifest to begin playing the video asset.
6. During the playback of the video, the client 202 will either poll the adaptive streaming server 206 to determine if there is a need to switch bandwidths, or will be informed via standard messaging protocols that they need to re-request an updated master manifest. When the adaptive streaming server 206 is polled, the adaptive streaming server 206 will check with the Network Monitoring and Management system 421 to determine the health of the network 208. The adaptive streaming server 206 will send a message to the client 202 indicating whether a new master manifest needs to be retrieved. The adaptive streaming server 206 will if needed construct the updated master manifest which includes bitrates for the given state of network utilization.
7. The client 202 is provided the updated master manifest and plays the next segment based on the updated master manifest according to its particular HTTP Adaptive Streaming specification. This particular example would work well where the content stream 203 is a linear broadcast or a VOD broadcast.
8. The client 202 can then later be sent a notification on manifest updates or poll the adaptive streaming server 206 at a configurable interval to check network status. The adaptive streaming server 206 may also include network health information within the master manifest (also known as index file in the case of a live stream). Upon indication that the network health has been lowered, the client 202 will request a new master manifest (index file) from the adaptive streaming server 206.

Referring to FIG. 5B, there is a flowchart illustrating the steps of an exemplary method 550 implemented by the adaptive streaming server 206 to provide the content stream 203 through the network 208 to one or more clients 202 in accordance with an embodiment of the present invention. At step 552, the adaptive streaming server 206 receives the client's request for a manifest of a content stream 203 (video asset 203). At step 554, the adaptive streaming server 206 obtains the network bandwidth allocation. At step 556, the adaptive streaming server 206 determines if the network bandwidth is below a current threshold. If the result of step 556 is no, then the adaptive streaming server 206 at step 558 determines video bit rate thresholds for the content stream 203. At step 560, the adaptive streaming server 206 builds the master manifest for the client 202 based on the network utilization. At step 562, the adaptive streaming server 206 notifies the client 202 that the master manifest is available. At step 564, the adaptive streaming server 206 permits the client 202 to retrieve the master manifest and then returns to step 554. If the result of step 556 is yes, then the adaptive streaming server 206 at step 566 determines if there is a new session. If the result of step 566 is no, the adaptive streaming server 206 returns to step 554. If the result of step 566 is yes, then the adaptive streaming server 206 at step 568 builds a master manifest. At step 570, the adaptive streaming server 206 sends the master manifest to client 202 and then returns to step 554.

Figure 6A:
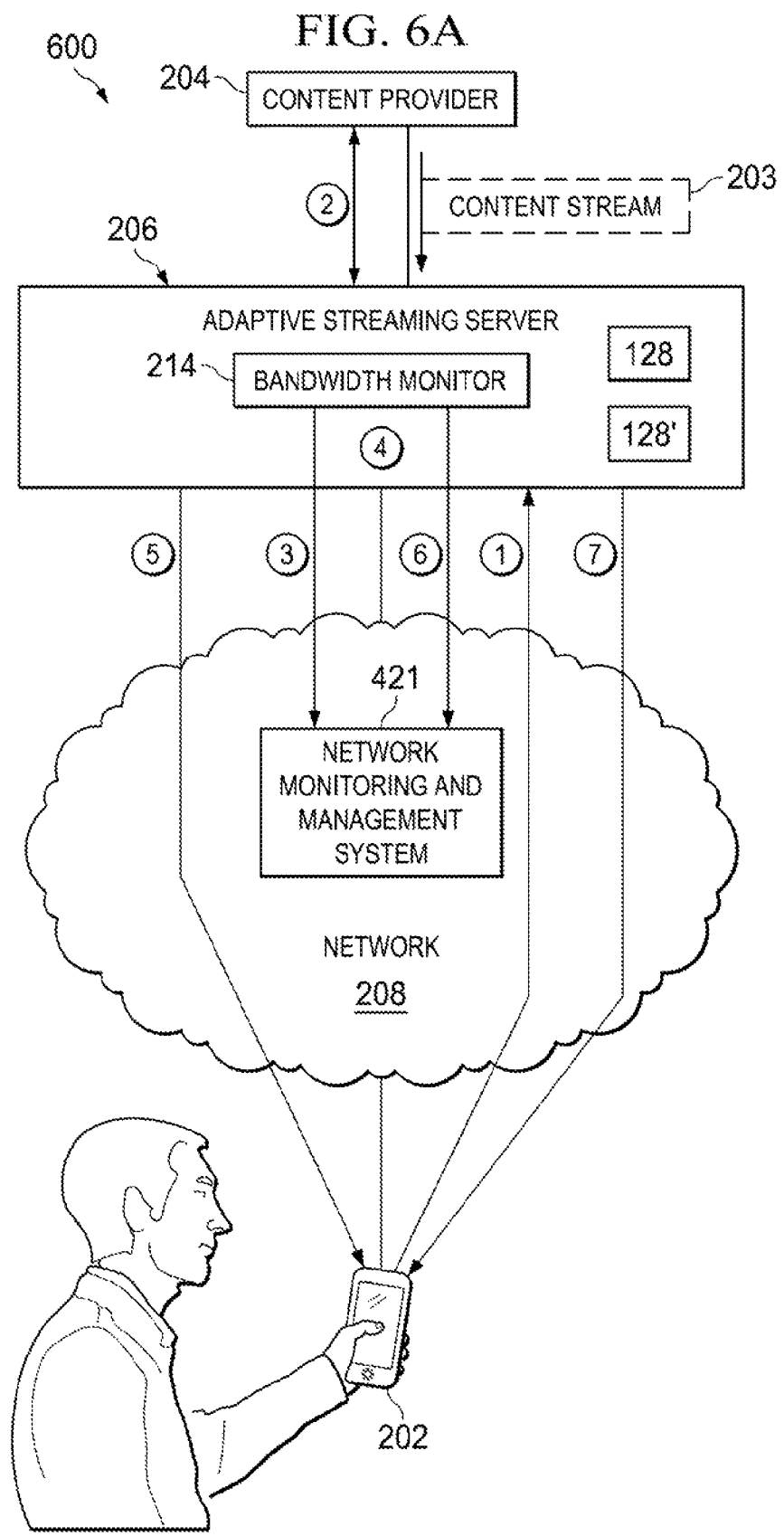
FIGS. 6A-6C are several diagrams used to help explain how an exemplary system including an adaptive streaming server can be configured to provide a content stream to a client in accordance with an embodiment of the present invention.
Figure 6B:
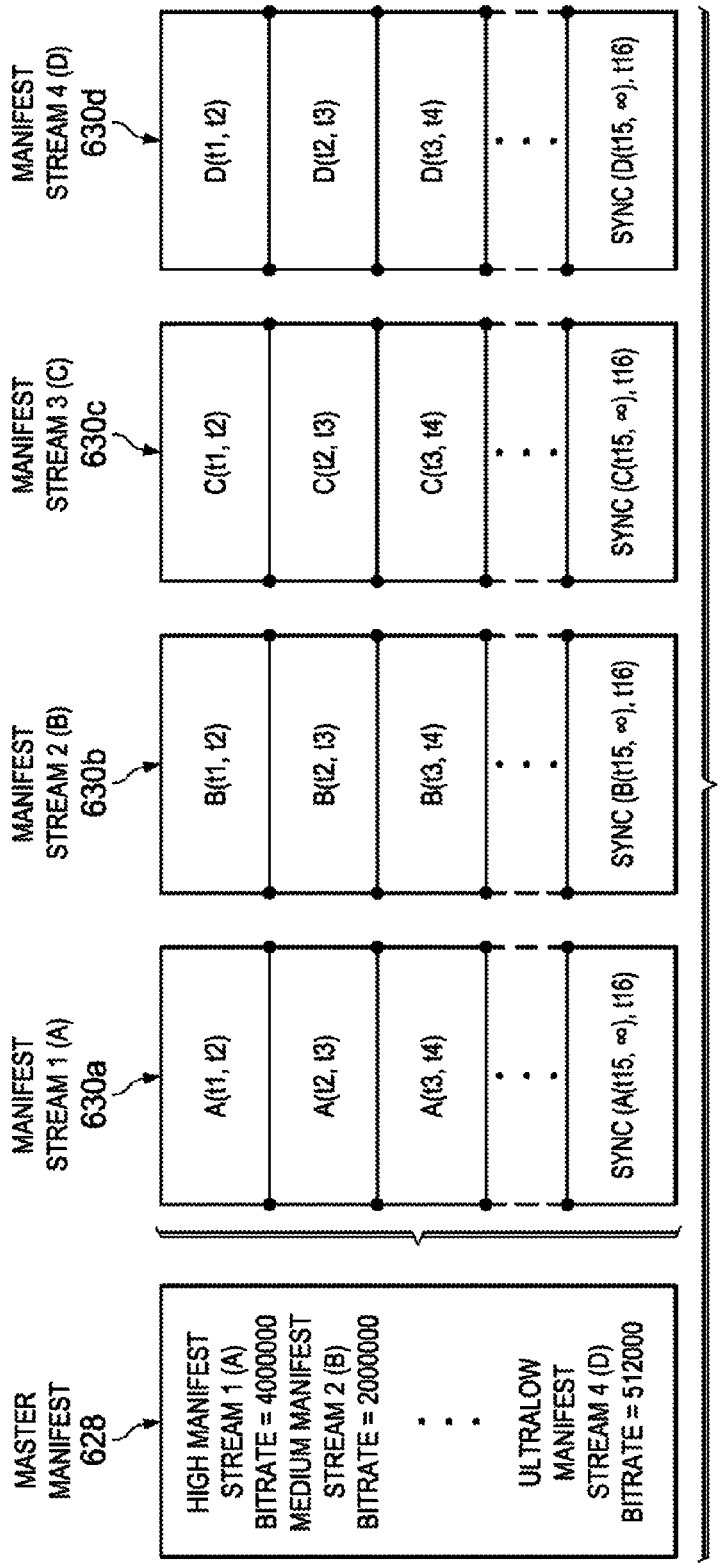
Figure 6C:
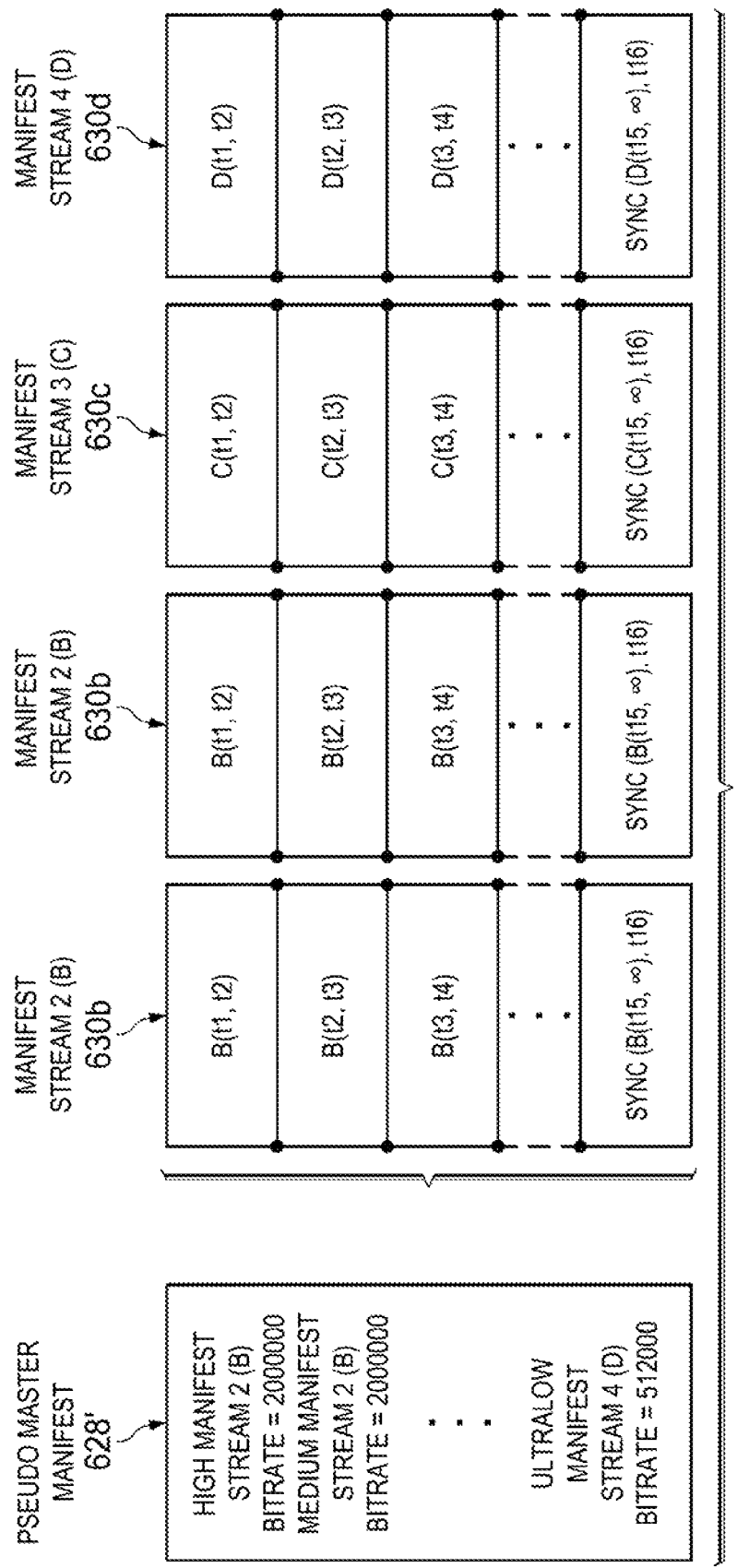

Referring to FIGS. 6A-6C, there are several diagrams used to help explain how an exemplary system 600 can be configured to provide a content stream 203 through a network 208 to one or more clients 202 (only one shown) in accordance with an embodiment of the present invention. As shown in FIG. 6A, the exemplary system 600 includes a content provider 204 and an adaptive streaming server 206. The content provider 204 interfaces with the adaptive streaming server 206 which in turn interfaces with the client 202 (only one shown) through the network 208 (e.g., IP network 208, CDN network 208, wireless network 208 or any combination thereof). Alternatively, the content provider 204 may be connected to the adaptive streaming server 206 through the network 208. The exemplary signaling that can take place between the components 202, 204, 206 and 208 are as follows:

1. The client 202 sends a request to play a content stream 203 where the request is received by the adaptive streaming server 206. For example, the content stream 203 can be a live, broadcast, or time shifted video or VOD asset.
2. The adaptive streaming server 206 retrieves the requested content stream 203 from the content provider 204.
3. The adaptive streaming server's bandwidth monitor 214 checks the network utilization (congestion level) by interfacing with a Network Monitoring and Management System 421 associated with the network 208 via standard communication such as web services, SNMP web services or other messaging.
4. When the bandwidth availability or network utilization information is returned from the Network Monitoring and Management System 421, then the adaptive streaming server 206 generates the master manifest 128 which is sent to the client 202. The adaptive streaming server 206 when generating the manifest file 128 takes into account the overall bandwidth availability or network utilization and if desired the number of clients 202 playing the content stream 203. At this point, assume the network utilization is under some configurable amount, then the adaptive streaming server 206 constructs the master manifest 128 (index file 128) to be used within an HTTP adaptive streaming which includes all of the available encodings at all of the available bitrates for the requested content stream 203 (video asset 203). FIG. 6B illustrates an exemplary master manifest 128 which has four child manifests 130a, 130b, 130c and 130d.
5. The master manifest 128 is returned to the client 202 which uses the master manifest 128 to begin playing the video asset.
6. During the playback of the video, the adaptive streaming server 206 at configurable periods check with the Network Monitoring and Management system 421 to determine health of the network 208. At this point, assume the network utilization now exceeds some configurable amount. Then, the adaptive streaming server 206 upon receiving a request from the client 202 to retrieve a segment associated with one of the higher bit rate child manifests (e.g., child manifest 130a) will rather than provide the requested segment instead provide a corresponding segment from one of the lower bit rate child manifests (e.g., child manifest 130b). In this example, the adaptive streaming server 206 will construe the master manifest 128 to be a "pseudo" master manifest 128' in which the original child manifest 130a associated with the highest bit rate is actually considered to be child manifest 130b associated with a lower bit rate. FIG. 6C illustrates an exemplary "pseudo" master manifest 128' in which the original child manifest 130a is now considered to be child manifest 130b such that there are four child manifests 130b, 130b, 130c and 130d. The adaptive streaming server 206 depending on the degree of the network congestion can construe the master manifest 128 to be a "pseudo" master manifest 128' in which multiple original child manifests 130a and 130b (for example) associated with the higher bit rates are actually considered to be child manifest 130c associated with a lower bit rate.
7. The client 202 is provided and plays the lower quality segment based on the "pseudo" master manifest 128' according to its particular HTTP Adaptive Streaming specification. After this point, the adaptive streaming server 206 can depending on the network congestion use the master manifest 128 or different "pseudo" master manifests 128' to respond to requests from the client 202 for retrieving specific segments of the content stream 203. This particular example would work well where the content stream 203 is a linear broadcast.

Figure 7A:
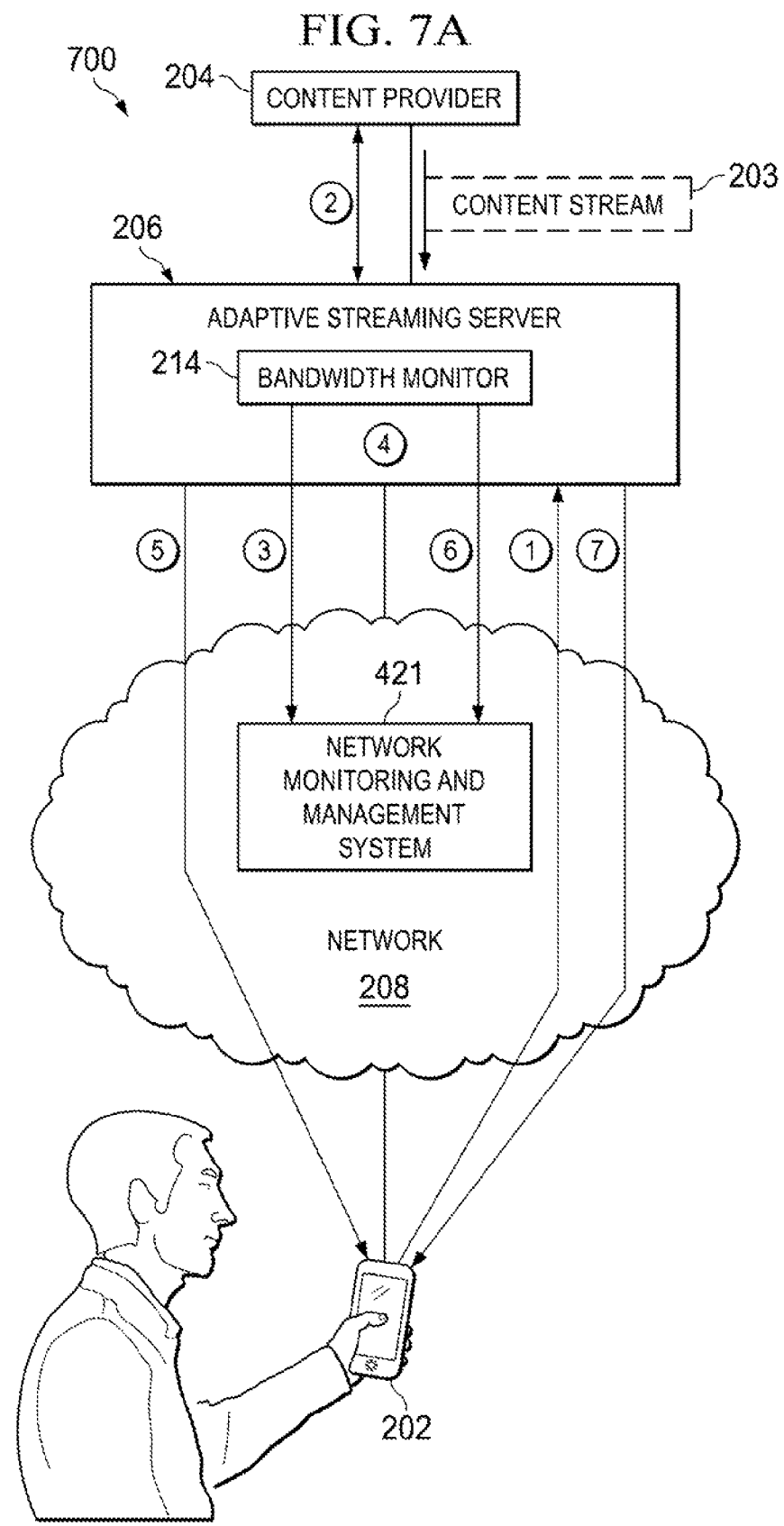
FIGS. 7A-7C are several diagrams used to help explain how an exemplary system including an adaptive streaming server can be configured to provide a content stream to a client in accordance with an embodiment of the present invention.
Figure 7B:
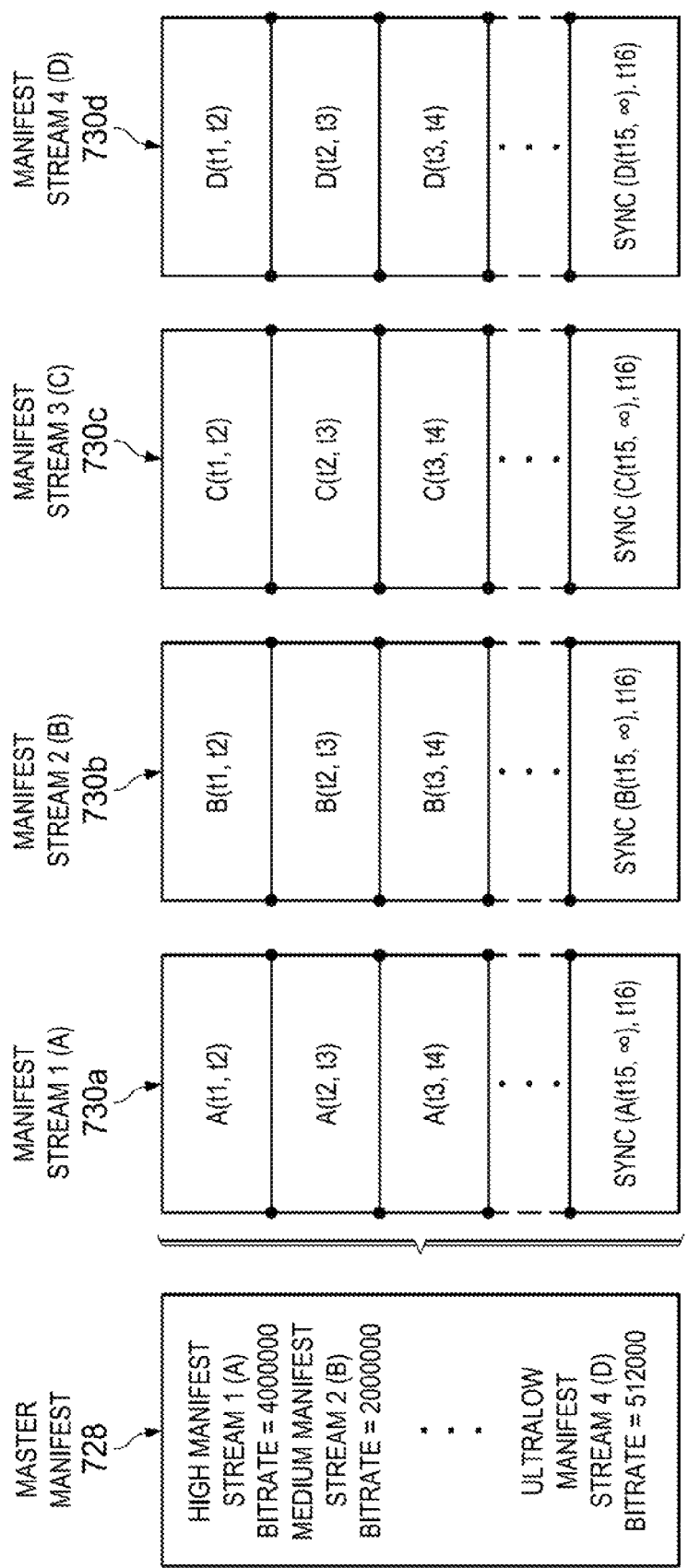
Figure 7C:
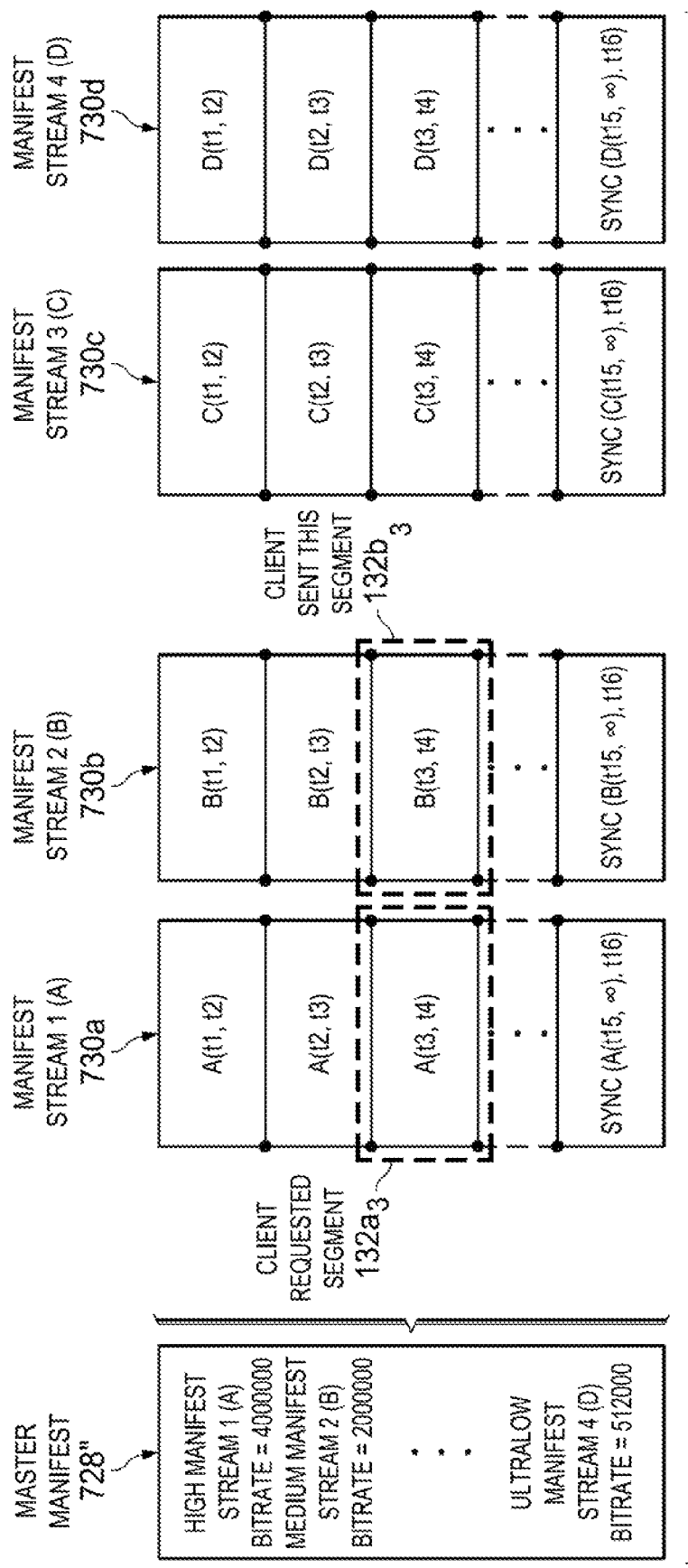

Referring to FIGS. 7A-7C, there are several diagrams used to help explain how an exemplary system 700 can be configured to provide a content stream 203 through a network 208 to one or more clients 202 (only one shown) in accordance with an embodiment of the present invention. As shown in FIG. 7A, the exemplary system 700 includes a content provider 204 and an adaptive streaming server 206. The content provider 204 interfaces with the adaptive streaming server 206 which in turn interfaces with the client 202 (only one shown) through the network 208 (e.g., IP network 208, CDN network 208, wireless network 208 or any combination thereof). Alternatively, the content provider 204 may be connected to the adaptive streaming server 206 through the network 208. The exemplary signaling that can take place between the components 202, 204, 206 and 208 are as follows:

1. The client 202 sends a request to play a content stream 203 where the request is received by the adaptive streaming server 206. For example, the content stream 203 can be a live, broadcast, or time shifted video or VOD asset.
2. The adaptive streaming server 206 retrieves the requested content stream 203 from the content provider 204.
3. The adaptive streaming server's bandwidth monitor 214 checks the network utilization (congestion level) by interfacing with a Network Monitoring and Management System 421 associated with the network 208 via standard communication such as web services, SNMP web services or other messaging.
4. When the bandwidth availability or network utilization information is returned from the Network Monitoring and Management System 421, then the adaptive streaming server 206 generates the master manifest 128 which is sent to the client 202. The adaptive streaming server 206 when generating the manifest file 128 takes into account the overall bandwidth availability or network utilization and if desired the number of clients 202 playing the content stream 203. At this point, assume the network utilization is under some configurable amount, then the adaptive streaming server 206 constructs the master manifest 128 (index file 128) to be used within an HTTP adaptive streaming which includes all of the available encodings at all of the available bitrates for the requested content stream 203 (video asset 203). FIG. 7B illustrates an exemplary master manifest 128 which has four child manifests 130a, 130b, 130c and 130d.
5. The master manifest 128 is returned to the client 202 which uses the master manifest 128 to begin playing the video asset.
6. During the playback of the video, the adaptive streaming server 206 at configurable periods check with the Network Monitoring and Management system 421 to determine health of the network 208. At this point, assume the network utilization now exceeds some configurable amount. Then, the adaptive streaming server 206 upon receiving a request from the client 202 to retrieve a higher bit rate segment (e.g., segment $132a_3$) associated with higher bit rate child manifests (e.g., child manifest 130a) will rather than provide the requested segment instead provide a corresponding segment (e.g., segment $132b_3$) from one of the lower bit rate child manifests (e.g., child manifest 130b). FIG. 7C illustrates an exemplary master manifest 128 which has four child manifests 130a, 130b, 130c and 130d but where the requested high bit rate segment 132$a_3$ (for example) is not retrieved by the adaptive streaming provider 206 but instead the corresponding lower quality segment 132$b_3$ (for example) is retrieved and sent to the client 203.

7. The client 202 is provided and plays the lower quality segment according to its particular HTTP Adaptive Streaming specification. After this point, the adaptive streaming server 206 can depending on the network congestion use the master manifest 128 to provide the requested segment or provide a corresponding lower quality segment to the client 202. This particular example would work well where the content stream 203 is a linear broadcast or VOD broadcast.

Figure 8B:
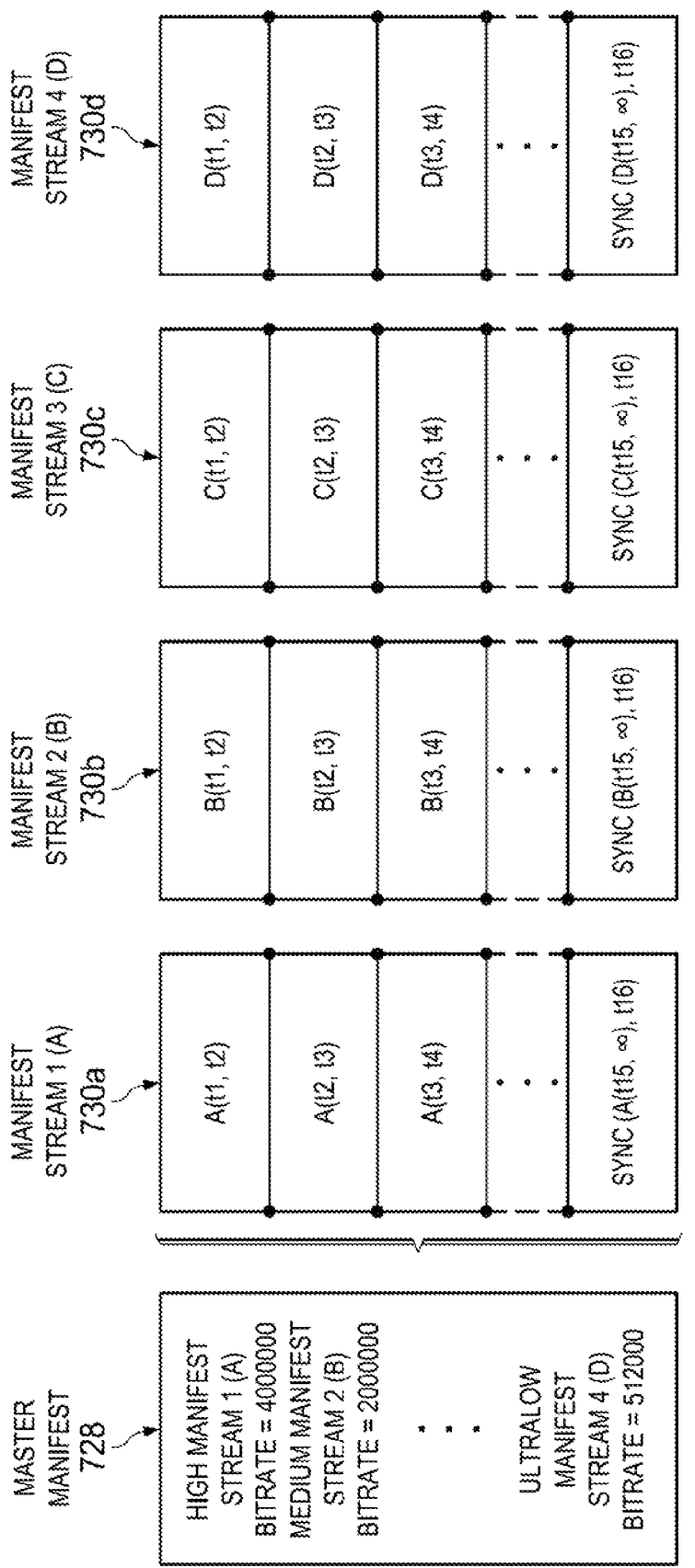
Figure 8C:
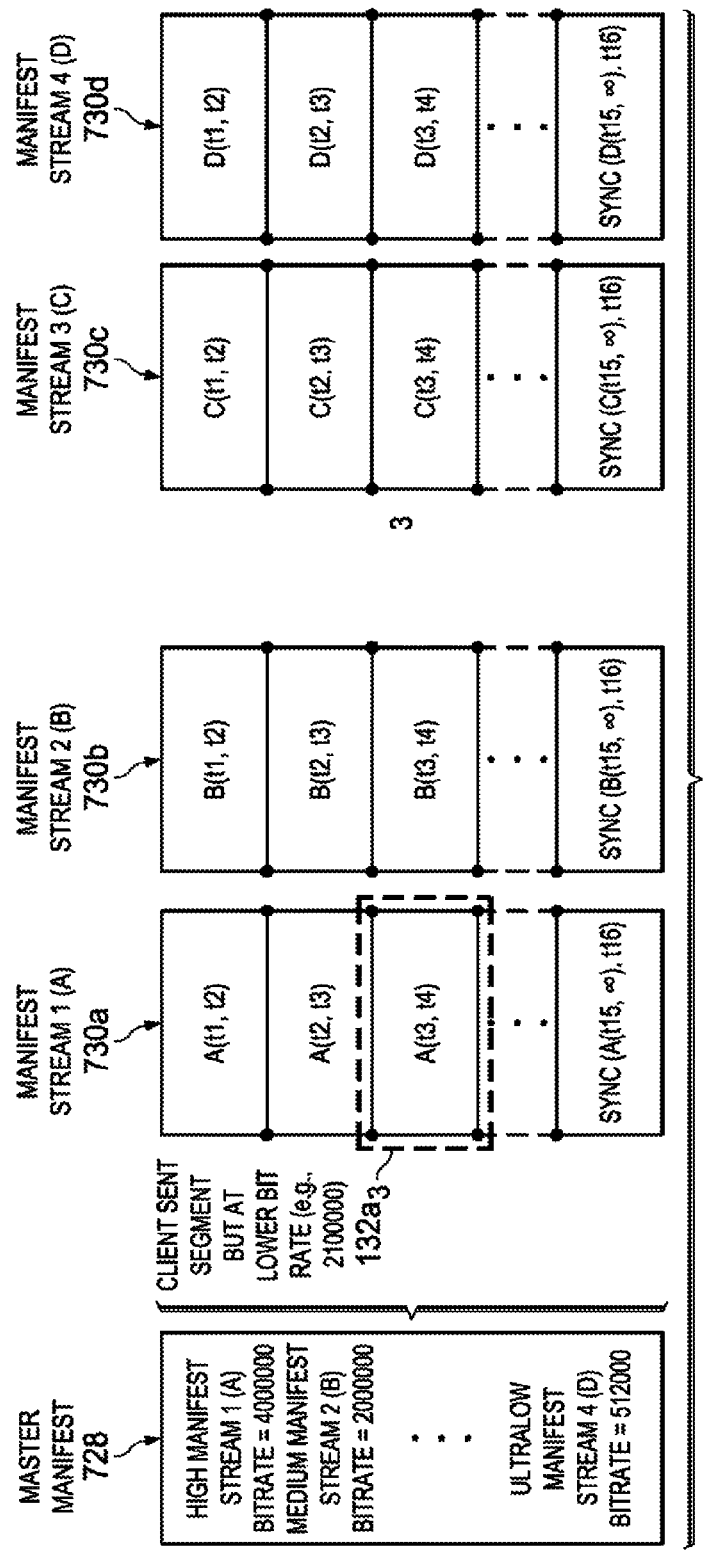

Referring to FIGS. 8A-8C, there are several diagrams used to help explain how an exemplary system 800 can be configured to provide a content stream 203 through a network 208 to one or more clients 202 (only one shown) in accordance with an embodiment of the present invention. As shown in FIG. 8A, the exemplary system 800 includes a content provider 204 and an adaptive streaming server 206. The content provider 204 interfaces with the adaptive streaming server 206 which in turn interfaces with the client 202 (only one shown) through the network 208 (e.g., IP network 208, CDN network 208, wireless network 208 or any combination thereof). Alternatively, the content provider 204 may be connected to the adaptive streaming server 206 through the network 208. The exemplary signaling that can take place between the components 202, 204, 206 and 208 are as follows:

1. The client 202 sends a request to play a content stream 203 where the request is received by the adaptive streaming server 206. For example, the content stream 203 can be a live, broadcast, or time shifted video or VOD asset.
2. The adaptive streaming server 206 retrieves the requested content stream 203 from the content provider 204.
3. The adaptive streaming server's bandwidth monitor 214 checks the network utilization (congestion level) by interfacing with a Network Monitoring and Management System 421 associated with the network 208 via standard communication such as web services, SNMP web services or other messaging.
4. When the bandwidth availability or network utilization information is returned from the Network Monitoring and Management System 421, then the adaptive streaming server 206 generates the master manifest 128 which is sent to the client 202. The adaptive streaming server 206 when generating the manifest file 128 takes into account the overall bandwidth availability or network utilization and if desired the number of clients 202 playing the content stream 203. At this point, assume the network utilization is under some configurable amount, then the adaptive streaming server 206 constructs the master manifest 128 (index file 128) to be used within an HTTP adaptive streaming which includes all of the available encodings at all of the available bitrates for the requested content stream 203 (video asset 203). FIG. 8B illustrates an exemplary master manifest 128 which has four child manifests 130a, 130b, 130c and 130d.
5. The master manifest 128 is returned to the client 202 which uses the master manifest 128 to begin playing the video asset.
6. During the playback of the video, the adaptive streaming server 206 at configurable periods check with the Network Monitoring and Management system 421 to determine health of the network 208. At this point, assume the network utilization now exceeds some configurable amount. Then, the adaptive streaming server 206 upon receiving a request from the client 202 to retrieve a higher bit rate segment (e.g., segment 132$a_3$) associated with higher bit rate child manifests (e.g., child manifest 130a) will obtain the requested segment (e.g., segment 132$a_3$) and then rate shape the obtained requested segment (e.g., segment 132$a_3$) so has a bit rate that is less than the bit rate associated with the higher bit rate child manifests (e.g., child manifest 130a). If desired, the adaptive streaming server 206 can rate shape the obtained requested segment (e.g., segment 132$a_3$) so has a bit rate that is different than any of the bit rates associated with any of the child manifests. FIG. 8C illustrates an exemplary master manifest 128 which has four child manifests 130a, 130b, 130c and 130d but where the requested high bit rate segment 132$a_3$ (for example) is retrieved by the adaptive streaming provider 206 and then rate shaped to have a lower bit rate (e.g., 2.1 Mbs) than the bit rate (e.g., 4.0 Mbs) of requested high bit rate segment 132$a_3$ (for example).

7. The client 202 is provided and plays the lower quality segment according to its particular HTTP Adaptive Streaming specification. After this point, the adaptive streaming server 206 can depending on the network congestion use the master manifest 128 to provide the requested segment or provide a corresponding lower quality segment to the client 202. This particular example would work well where the content stream 203 is a linear broadcast or VOD broadcast.

From the foregoing, the skilled person having the foregoing teaching will readily appreciate that disclosed adaptive streaming server 206 (e.g., HTTP adaptive streaming server 206) is network aware. In particular, the adaptive streaming server 206 is configured to "call out" to third party devices or systems to determine the current network load across all or a particular segment of a service provider's network 208. The adaptive streaming server 206 is also configured to adjust its available video bitrates (quality) during times of high network utilization to rate shape and balance the entire video streaming network. As a result, during peak utilization, clients 202 will receive a less bandwidth intensive version of the video they are consuming. If desired, the adaptive streaming server 202 during network congestion can be configured to allow a portion of the clients 202 to continue to receive segments associated with the higher bit rates while preventing another portion of the clients 202 from receiving requested segments associated with the higher bit rates but instead sending those client 202 the corresponding segments which have lower bit rates. In any case, because this is a server based solution, at least a portion of the clients 202 will need to adjust their desired bit rate and as a result the network load will be lessened. The adaptive streaming server 206 has many advantages one of which is it allows network operators who are serving video over their networks to rate shape the video to lower bandwidth consumption across their network. In particular, the service provider during peak utilization times will be able to lessen the impact on the network when providing video to their customers. If desired, this rate shaping could for example be used to maintain quality of service for videos that are purchased while free movies and other content are rate shaped.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. An adaptive streaming server for transmitting a content stream through a network to a client, the adaptive streaming server comprising:
   a Hypertext Transfer Protocol (HTTP) server comprising an input interface configured to receive a request from the client to play the content stream;
   a segmenting unit configured to receive multiple files of the content stream where the multiple files are encoded at different bit rates and further configured to segment each of the multiple files into a plurality of segments;
   a segment storage unit configured to store the plurality of segments;
   the HTTP server further comprising:
      a processing unit configured to generate a master manifest that includes a plurality of child manifests, wherein the first child manifest has references to the segments having a first bit rate, the second child manifest has references to the segments having a second bit rate, and the third child manifest has references to the segments having a third bit rate, and wherein the first bit rate is higher than the second bit rate which is higher than the third bit rate;
      an output interface configured to send the master manifest to the client;
      the input interface configured to receive a request from the client to fetch a specific one of the segments corresponding to the content stream;
      the processing unit configured to obtain the requested segment from the segment storage unit;
      the output interface configured to send the requested segment to the client;
      a bandwidth monitor configured to monitor a congestion level within the network; and
      the processing unit is configured to determine if the congestion level within the network exceeds a predetermined threshold and when this occurs is further configured such that if the client requests the segments associated with the first child manifest then the client is sent segments which have a bit rate that is less than the first bit rate by:
   receiving a request from the client to fetch one of the segments associated with the first child manifest corresponding to the content stream;
   obtaining a corresponding segment associated with one of the multiple files which has a bit rate that is less than the first bit rate rather than obtain the requested segment, wherein the corresponding segment is referenced by one of the second child manifest or the third child manifest; and
   sending the obtained segment to the client which playbacks the obtained segment.

2. The adaptive streaming server of claim 1, wherein the content stream is a linear content stream of a video-on-demand content stream.

3. The adaptive streaming server of claim 1, wherein the processing unit is configured to consider the segments referenced by the first child manifest to be the segments referenced by the second child manifest.

4. The adaptive streaming server of claim 3, wherein the content stream is a linear content stream.

5. The adaptive streaming server of claim 1, wherein the processing unit is configured to consider the requested segment referenced by the first child manifest to be the corresponding segment referenced by the second child manifest.

6. The adaptive streaming server of claim 5, wherein the content stream is a linear content stream of a video-on-demand content stream.

7. The adaptive streaming server of claim 1, wherein the server is configured to send the master manifest to a plurality of clients and when the congestion level within the network exceeds the predetermined threshold then the server is further configured to allow a portion of the clients to continue to receive segments associated with the first child manifest while preventing another portion of the clients from requesting the segments associated with the first child manifest or if those clients requests the segments associated with the first child manifest then sending the corresponding segments which have a bit rate that is less than the first bit rate to those clients.

8. The adaptive streaming server of claim 1, wherein the client is one of: a personal computer, a mobile phone, a tablet, or a Hypertext Transfer Protocol (HTTP) capable television.

9. A method implemented by an adaptive streaming server for transmitting a content stream through a network to a client, the method comprising:
   receiving a request from the client to play the content stream;
   receiving multiple files of the content stream where the multiple files are encoded at different bit rates;
   segmenting each of the multiple files into a plurality of segments;
   storing the plurality of segments;
   generating a master manifest that includes a plurality of child manifests, wherein the first child manifest has references to the segments having a first bit rate, the second child manifest has references to the segments having a second bit rate, and the third child manifest has references to the segments having a third bit rate, and wherein the first bit rate is higher than the second bit rate which is higher than the third bit rate;
   sending the master manifest to the client;
   receiving a request from the client to fetch a specific one of the segments corresponding to the content stream;
   obtaining the requested segment;
   sending the requested segment to the client;
   monitoring a congestion level within the network; and
   determining if the congestion level within the network exceeds a predetermined threshold and when this occurs if the client requests the segments associated with the first child manifest then the client is sent segments which have a bit rate that is less than the first bit rate by:
   receiving a request from the client to fetch one of the segments associated with the first child manifest corresponding to the content stream;
   obtaining a corresponding segment associated with one of the multiple files which has a bit rate that is less than the first bit rate rather than obtaining the requested segment, wherein the corresponding segment is referenced by one of the second child manifest or the third child manifest; and
   sending the obtained segment to the client which playbacks the obtained segment.

10. The method of claim 9, wherein the content stream is a linear content stream of a video-on-demand content stream.

11. The method of claim 9, wherein during the obtaining operation further considering the segments referenced by the first child manifest to be the segments referenced by the second child manifest.

12. The method of claim 11, wherein the content stream is a linear content stream.

13. The method of claim 9, wherein during the obtaining operation further considering the requested segment referenced by the first child manifest to be the corresponding segment referenced by the second child manifest.

14. The method of claim 13, wherein the content stream is a linear content stream of a video-on-demand content stream.

15. The method of claim 9, further comprising sending the master manifest to a plurality of clients and when the congestion level within the network exceeds the predetermined threshold then allowing a portion of the clients to continue to receive segments associated with the first child manifest while preventing another portion of the clients from requesting the segments associated with the first child manifest or if those clients requests the segments associated with the first child manifest then sending the corresponding segments which have a bit rate that is less than the first bit rate to those clients.

16. The method of claim 9, wherein the client is one of a personal computer, a mobile phone, a tablet, or a Hypertext Transfer Protocol (HTTP) capable television.

* * * * *